(12) United States Patent
Zhang et al.

(10) Patent No.: US 12,345,666 B2
(45) Date of Patent: Jul. 1, 2025

(54) MULTI-PHYSICAL FIELD MEASUREMENT DEVICE FOR METAL SOLIDIFICATION PROCESS AND HOUSING THEREOF, AND MEASUREMENT METHOD

(71) Applicant: SHANGHAI JIAOTONG UNIVERSITY, Shanghai (CN)

(72) Inventors: Jiao Zhang, Shanghai (CN); Yang Tang, Shanghai (CN); Ya Zhang, Shanghai (CN); Yue Wu, Shanghai (CN); Hui Xing, Shanghai (CN); Baode Sun, Shanghai (CN); Yanfeng Han, Shanghai (CN); Yongbing Dai, Shanghai (CN); Chaopeng Fu, Shanghai (CN); Qing Dong, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 233 days.

(21) Appl. No.: 18/017,001

(22) PCT Filed: Jun. 11, 2021

(86) PCT No.: PCT/CN2021/099844
§ 371 (c)(1),
(2) Date: Jan. 19, 2023

(87) PCT Pub. No.: WO2022/022115
PCT Pub. Date: Feb. 3, 2022

(65) Prior Publication Data
US 2023/0314349 A1     Oct. 5, 2023

(30) Foreign Application Priority Data
Jul. 27, 2020   (CN) .......................... 202010735899.7

(51) Int. Cl.
*G01N 23/207* (2018.01)
*G01J 5/061* (2022.01)
(Continued)

(52) U.S. Cl.
CPC .......... *G01N 23/2076* (2013.01); *G01J 5/061* (2013.01); *G01N 23/20033* (2013.01);
(Continued)

(58) Field of Classification Search
None
See application file for complete search history.

(56) References Cited

U.S. PATENT DOCUMENTS

| 4,435,828 A * | 3/1984 | Epstein | ................ G01N 23/223 378/49 |
| 2016/0189922 A1* | 6/2016 | Kooijman | ............ G01N 23/223 250/307 |

(Continued)

FOREIGN PATENT DOCUMENTS

| CN | 106568575 | 4/2017 |
| CN | 107238620 | 10/2017 |

(Continued)

OTHER PUBLICATIONS

International Search Report issued in PCT Application No. PCT/CN2021/099844, dated Aug. 27, 2021.

*Primary Examiner* — Hoon K Song
(74) *Attorney, Agent, or Firm* — Hawaii Patent Services; Nathaniel K. Fedde; Kenton N. Fedde

(57) ABSTRACT

A multi-physical field measurement device for a metal solidification process and a housing and a measurement method thereof are provided. The device includes: a sealed housing provided with a light-through hole; a heater provided inside the housing and located behind the light-through hole along an X-ray; a diffraction detector used for (Continued)

receiving the X-ray which penetrates through a sample sheet and is scattered; a CMOS camera located behind the heater along the X-ray (11) and used for receiving a visible light signal which penetrates through the sample sheet; a silicon drift X-ray detector located at one side of the X-ray and used for receiving a fluorescent signal sent by interaction between the X-ray and the sample sheet; and an infrared thermal imager located at the other side of the X-ray and used for receiving an infrared signal sent by the sample sheet.

19 Claims, 8 Drawing Sheets

(51) Int. Cl.
    *G01N 23/20033*     (2018.01)
    *G01N 23/223*     (2006.01)
    *G01T 1/20*     (2006.01)
    *G01J 5/00*     (2022.01)

(52) U.S. Cl.
    CPC ....... *G01N 23/223* (2013.01); *G01T 1/20187* (2020.05); *G01J 2005/0077* (2013.01); *G01J 2005/063* (2013.01)

(56) References Cited

U.S. PATENT DOCUMENTS

| | | | |
|---|---|---|---|
| 2019/0064085 A1* | 2/2019 | Furukawa | G01N 21/01 |
| 2019/0145915 A1* | 5/2019 | Kimijima | G01N 23/085 378/51 |
| 2020/0249147 A1* | 8/2020 | Bernhard | G01N 21/01 |
| 2021/0010960 A1* | 1/2021 | Wiell | G21K 1/06 |

FOREIGN PATENT DOCUMENTS

| | | |
|---|---|---|
| CN | 107843614 | 3/2018 |
| CN | 108717064 | 10/2018 |
| CN | 109142406 | 1/2019 |
| CN | 109708980 | 5/2019 |
| CN | 109990829 | 7/2019 |
| CN | 110095416 | 8/2019 |
| CN | 209606353 | 11/2019 |
| CN | 111257356 | 6/2020 |
| CN | 111337439 | 6/2020 |
| WO | 2015151761 | 10/2015 |

\* cited by examiner

MULTI-PHYSICAL FIELD MEASUREMENT DEVICE FOR METAL SOLIDIFICATION PROCESS AND HOUSING THEREOF, AND MEASUREMENT METHOD

CROSS-REFERENCE TO RELATED APPLICATIONS

The present application claims priority to Chinese Patent Application No. 2020107358997, entitled "Multi-physical Field Measurement Device for Metal Solidification Process and Measurement Method", filed with China National Intellectual Property Administration on Jul. 27, 2020, the entire content of which is incorporated herein by reference.

TECHNICAL FIELD

The present application relates to the field of analysis and measurement, and particularly to a multi-physical field measurement device for a metal solidification process, and a housing and a measurement method thereof.

BACKGROUND ART

Evolution of a metal solidification structure is influenced by complex factors of coupling effects of a plurality of physical fields, such as a temperature field, a solute field, a strain field, a flow field, or the like. Due to time correlation of a metal solidification process, high-temperature opacity of alloy melt, trans-scale evolution of an organizational structure, or the like, it is extremely difficult to perform in-situ real-time quantitative characterization on the plural physical fields in the metal solidification process. However, associated real-time in-situ measurement of the plural physical fields in the metal solidification process is of great practical significance for verification of a solidification theory, a development of novel high-performance alloy materials and acceleration of research of important casting solidification forming processes.

Currently, only a single detector is usually used for researching parameters in the metal solidification process, and only single information in the metal solidification process can be obtained in this way. For example, a charge coupled device (CCD) detector or a complementary metal oxide semiconductor (CMOS) detector is used to detect crystal growth and a dynamic structure evolution process; a fluorescent detector is used to detect element distribution in the metal solidification process; and a diffraction detector is used to measure crystal strain.

SUMMARY

An object of embodiments of the present application is to provide a multi-physical field measurement device for a metal solidification process, and a housing and a measurement method thereof, which can simultaneously measure in situ a temperature field, a solute field, a strain field, and a flow field in a metal solidification process.

In a first aspect, an embodiment of the present application provides a multi-physical field measurement device for a metal solidification process, including:
a sealed housing, provided with a light-through hole configured for allowing an external X-ray to be emitted into an inside of the housing;
a heater, provided inside the housing, located behind the light-through hole along the X-ray and used for heating a to-be-detected sample;
a diffraction detector, used for receiving the X-ray which penetrates through the sample and is scattered;
a CMOS camera, located behind the heater along the X-ray and used for receiving a visible light signal which penetrates through the sample;
a silicon drift X-ray detector, located at one side of the X-ray and used for receiving a fluorescent signal sent by interaction between the X-ray and the sample; and
an infrared thermal imager, located at the other side of the X-ray and used for receiving an infrared signal sent by the sample.

In the above implementation process, the heater is used for heating the sample to be molten, and the diffraction detector, the CMOS camera, the silicon drift X-ray detector and the infrared thermal imager are integrated as a whole. In the above, the silicon drift X-ray detector is used for receiving the fluorescent signal, the incident X-ray interacts with the sample to emit the fluorescent signal, the X-ray is synchronously radiated to penetrate through the sample, carried element ingredient information of the sample is received by the silicon drift X-ray detector, and quantitative measurement of element ingredients of the sample is realized to obtain a solute field of a sample solidification process; the infrared thermal imager is used for receiving the infrared signal, and the sample sends the infrared signal which contains temperature information of a sample micro region and is detected by the infrared thermal imager, to realize temperature measurement of the sample micro region to obtain a temperature field of the sample solidification process; the CMOS camera is used for receiving visible light carrying sample morphology information, to achieve imaging of dendritic crystal morphology of the sample solidification process to obtain a flow field of the sample solidification process; and the diffraction detector detects a scattering signal with an angle greater than 5 degrees sent by the sample, which can be used for physical phase analysis, crystal structure analysis, an orientation degree and macroscopic stress measurement, so as to obtain a strain field of the sample solidification process. Therefore, the multi-physical field measurement device for a metal solidification process according to the embodiment of the present application can simultaneously measure in situ the temperature field, the solute field, the strain field, and the flow field in the metal solidification process.

In a possible implementation, a scintillator which is located behind the heater along the X-ray and in front of the CMOS camera is further included, and the X-ray penetrating through the sample passes through the scintillator to form the visible light signal which is then received by the CMOS camera.

In the above implementation process, the X-ray carrying the sample morphology information interacts with the scintillator to form the visible light which is received by the CMOS camera, such that the dendritic crystal morphology of the sample solidification process is imaged.

In a possible implementation, an optical lens group used for amplifying the visible light signal and reflecting the visible light signal to be received by the CMOS camera is further included, the optical lens group is located behind the scintillator along the X-ray, and the CMOS camera is used for receiving the visible light signal reflected by the optical lens group;

preferably, the CMOS camera is located above the optical lens group, and the optical lens group directly faces the incident X-ray, forms an angle of 45° relative to an optical path of the incident X-ray and reflects light upwards to be received by the CMOS camera.

In the above implementation process, the optical lens group is used for amplifying the visible light signal and reflecting the visible light signal to be received by the CMOS camera.

In a possible implementation, a baffle with a small hole, provided between the heater and the silicon drift X-ray detector, is further included, and the fluorescent signal passes through the small hole to be received by the silicon drift X-ray detector.

In the above implementation process, the small hole on the baffle has a small hole imaging effect to adjust a size of an observation region.

In a possible implementation, the diffraction detector, the CMOS camera, the silicon drift X-ray detector, and the infrared thermal imager are all located outside the housing, and windows for allowing the signals to penetrate therethrough are provided at corresponding positions on the housing.

In a possible implementation, a top and a tail of the housing are respectively provided with a third window and a fifth window for placing the diffraction detector respectively;
  preferably, the third window is of a long strip shape, and the fifth window is circular and is sealed by a Kapton film;
  preferably, a window which extends into a cavity is provided on a right side of the housing and is used for placing the infrared thermal imager, and calcium fluoride optical glass is adopted for the window;
  preferably, a window which extends into the cavity is provided on a left side of the housing and is used for placing the silicon drift X-ray detector, and the window is sealed by the Kapton film; and
  preferably, a fourth window is further provided on the top of the housing and used for placing the CMOS camera.

In the above implementation process, the plurality of windows are provided on the housing in conjunction with characteristics of the individual detectors, such that the signals received by the individual detectors can pass through the windows, and meanwhile, leakproofness inside the housing is guaranteed.

In a possible implementation, a PC terminal provided outside the housing is further included, and the PC terminal is connected with the diffraction detector, the CMOS camera, the silicon drift X-ray detector and the infrared thermal imager, respectively.

In the above implementation process, the PC terminal is connected with all the detectors, thus realizing linkage among the detectors and visualization of measurement results of all the detectors.

In a possible implementation, a micro-motion displacement platform used for moving the sample is further included.

In a possible implementation, a controller provided outside the housing is further included, and the controller is connected with the heater, the micro-motion displacement platform and the PC terminal, respectively.

In the above implementation process, by moving the sample by the micro-motion displacement platform, a specific angle can be formed between the sample and the detector, and different portions of the sample can be scanned by the detector, thereby realizing trans-scale in-situ real-time quantitative characterization of evolution of a sample solidification structure from nanometer to millimeter.

In a possible implementation, a cooling assembly used for reducing an internal temperature of the housing is further included; and optionally, the cooling assembly is a circulating water path arranged inside the housing; and/or,
  a vacuum pump provided outside the housing is further included, the vacuum pump is communicated with the housing, and a gas flowmeter is provided on a communication pipeline.

In the above implementation process, the cooling assembly can reduce an influence of an over-high internal temperature on the solidification process, with the over-high internal temperature being caused by sealing of the housing, and meanwhile reduce an influence of the over-high internal temperature on measurement of the real temperature of the sample by the infrared thermal imager. The vacuum pump forms a vacuum environment in the housing, thus avoiding that the sample is oxidized in a thermal process to generate oxide skin, thus influencing a detection result.

In a possible implementation, the housing is made of stainless steel, and an inner surface thereof is a frosted surface; and/or, a viewing window is provided on the housing; and/or an openable cabin door is provided on the housing.

In the above implementation process, an inner surface layer of the housing is processed to be frosted, thus avoiding that the X-ray is reflected to the infrared thermal imager to affect the detection result; the viewing window facilitates a worker to monitor working conditions of all components inside the housing; and the cabin door facilitates the worker to place the sample and perform other operations.

A multi-physical field measurement device for a metal solidification process includes:
  a sealed housing, provided with a light-through hole configured for allowing an external X-ray to be emitted into an inside of the housing;
  a heater, provided inside the housing, located behind the light-through hole along the X-ray and used for heating a to-be-detected sample;
  a diffraction detector, used for receiving the X-ray which penetrates through the sample and is scattered;
  an imaging detector, the imaging camera being located behind the heater along the X-ray and used for receiving a visible light signal which penetrates through the sample;
  a fluorescent detector, located at one side of the X-ray and used for receiving a fluorescent signal sent by interaction between the X-ray and the sample; and
  an infrared thermal imager, located at the other side of the X-ray and used for receiving an infrared signal sent by the sample.

In a second aspect, an embodiment of the present application provides a multi-physical field measurement device for a metal solidification process, including:
  a vacuum water-cooling cavity system including a housing and a cooling assembly provided in the housing and used for reducing an internal temperature of the housing, wherein a front end of the housing is provided with a light-through hole for allowing an external X-ray to be emitted into the inside of the housing; a left side of the housing is provided with a high-temperature-resistant glass viewing window; and the housing is provided with an openable cabin door for facilitating adjustment of a sample;
  a sample temperature control system including a heater which is provided inside the housing, located behind the light-through hole along the X-ray and used for fixing and heating the to-be-detected sample;

a sample transmission system including a micro-motion displacement platform provided below the heater and used for moving the heater and changing the position of the sample fixed thereto;

a synchronous X-radiation detector system including a diffraction detector used for receiving the X-ray penetrating through the sample and being scattered, a CMOS camera used for measuring a flow field in the metal solidification process, a silicon drift X-ray detector used for measuring a solute field in the metal solidification process, and an infrared thermal imager used for measuring a temperature field in the metal solidification process, wherein the diffraction detector is provided at a top of a cavity and/or a tail of the cavity, the CMOS camera is located behind the heater along the X-ray, the silicon drift X-ray detector is located at one side of the X-ray and used for receiving a fluorescent signal emitted by interaction between the X-ray and the sample, and the infrared thermal imager is located at the other side of the X-ray and used for receiving an infrared signal sent by the sample;

a data collection and analysis system including a PC terminal and a controller which are provided outside the housing, wherein the PC terminal is connected with the diffraction detector, the CMOS camera, the silicon drift X-ray detector and the infrared thermal imager respectively; and the controller is connected with the heater, the micro-motion displacement platform and the PC terminal.

In a third aspect, an embodiment of the present application provides a multi-physical field measurement system for a metal solidification process, including the multi-physical field measurement device for a metal solidification process according to the foregoing embodiment, and an analysis device for analyzing multi-physical field data obtained by the multi-physical field measurement device for a metal solidification process, wherein the PC terminal of the multi-physical field measurement device for a metal solidification process is connected with the analysis device.

In a fourth aspect, an embodiment of the present application provides a use of the multi-physical field measurement system for a metal solidification process according to the foregoing embodiment in analysis of the metal solidification process.

In a fifth aspect, an embodiment of the present application provides a measurement method based on the multi-physical field measurement device for a metal solidification process provided in the first aspect, including the following steps:

heating the to-be-detected sample by the heater, adjusting the X-ray to be emitted into the inside of the housing through the light-through hole and irradiate the sample, converting the X-ray penetrating through the sample into the visible light signal, receiving the visible light signal by the CMOS camera, and obtaining an image of dendritic crystal morphology of a sample solidification process;

the diffraction detector receiving the X-ray which penetrates through the sample and is scattered, so as to realize qualitative analysis, lattice constant determination and stress measurement of a matter structure;

the infrared thermal imager receiving the infrared signal sent by the sample, to realize temperature measurement of a sample micro region; and the silicon drift X-ray detector receiving the fluorescent signal sent through interaction between the X-ray irradiated on the sample and the sample, to realize quantitative measurement of element ingredient of the sample.

In a possible implementation, before the sample is heated, the measurement method further includes: vertically mounting the sample on the heater and fixing the sample;

preferably, fixedly attaching the sample between two heating plates, and fixedly pasting two K-type thermocouples between the heating plates and the sample, respectively; and then fixing, through the cabin door, the heater mounted with the sample on the micro-motion displacement platform inside the housing.

In the above implementation process, the measurement method based on the multi-physical field measurement device for a metal solidification process can simultaneously measure in situ a temperature field, a solute field, a strain field, and a flow field in a metal solidification process.

In a sixth aspect, an embodiment of the present application provides a housing of a measurement device, including: a housing body, a sample mounting table, a first window, a first mounting seat, a second window, a second mounting seat, a third window, a third mounting seat, a fourth window and a fourth mounting seat, wherein the housing body is provided with a light-through hole for allowing an external X-ray to be emitted into the inside of the housing; the sample mounting table is provided inside the housing body; the first window is provided at a top of the housing body; the first mounting seat is provided outside the housing body, located at the first window and used for mounting a diffraction detector; the second window is provided at the top of the housing body; and the second mounting seat is provided outside the housing body, located at the second window and used for mounting a CMOS camera. The third window is provided on a side of the housing body; the third mounting seat is provided outside the housing body, located at the third window and used for mounting a silicon drift X-ray detector; the fourth window is provided on a side of the housing body, and the fourth window and the third window are located on two sides of the light-through hole respectively; and the fourth mounting seat is provided outside the housing body, located at the fourth window and used for mounting an infrared thermal imager.

In the above implementation process, the housing of a measurement device may be applied to the multi-physical field measurement device for a metal solidification process provided in the first aspect and used for simultaneously measuring in situ a temperature field, a solute field, a strain field, and a flow field in a metal solidification process.

In a possible implementation, it further includes: at least one sliding rail and at least one sliding block, wherein the at least one sliding rail is provided on an outer wall of the housing body, located at the first window, and provided with a plurality of fixing holes; and the at least one sliding block is movably provided on the at least one sliding rail and connected with the first mounting seat, wherein the first mounting seat is provided with a first connecting hole, and a first fixing piece matched with any fixing hole penetrates through the first connecting hole.

In the above implementation process, linear movement of the first mounting seat for mounting the diffraction detector is realized through the arrangement of the at least one sliding rail and the at least one sliding block, such that a distance between the diffraction detector and the sample can be adjusted, which facilitates the diffraction detector to measure the samples with different types and different ingredients, and improves an optical signal capturing range.

In a possible implementation, the first mounting seat includes: a first base plate, an inner connecting frame and at least one outer side plate, wherein the first base plate is fixedly connected with the sliding block; the outer side plate is fixedly connected with the first base plate, and the outer side plate is provided with a strip-shaped hole; and the inner connecting frame is hinged to the first base plate, the inner connecting frame is provided with a second connecting hole, and a second fixing piece matched with the strip-shaped hole penetrates through the second connecting hole.

In the above implementation process, rotation of the first mounting seat relative to the housing body is realized through the arrangement of the first base plate, the inner connecting frame and the outer side plate, such that an angle between the diffraction detector and the sample can be adjusted, which facilitates the diffraction detector to measure the samples with different types and different ingredients, and improves the optical signal capturing range.

In a possible implementation, the third window includes: a third concave flange and a third through hole, wherein the housing body is provided with the third through hole, and the third concave flange is located at the third through hole and connected to the housing body and extends inwards. The fourth window includes: a fourth concave flange and a fourth through hole, wherein the housing body is provided with the fourth through hole, and the fourth concave flange is located at the fourth through hole and connected to the housing body and extends inwards.

In the above implementation process, the arrangement of the third concave flange and the fourth concave flange facilitates satisfying requirements of the silicon drift X-ray detector and the infrared thermal imager on detection distances respectively.

In a possible implementation, each of the first window, the second window, the third window and the fourth window is provided with a light-transmitting film for sealing. In the above implementation process, the arrangement of the light-transmitting film facilitates satisfying requirements of the measurement device.

In a possible implementation, it further includes: a fifth window and a fifth mounting seat, wherein the fifth window is provided on the housing body and opposite to the light-through hole; and the fifth mounting seat is provided outside the housing body, located at the fifth window and used for mounting the diffraction detector.

BRIEF DESCRIPTION OF DRAWINGS

To describe the technical solutions in the embodiments of the present application more clearly, the following briefly describes the drawings required to be used in the embodiments of the present application. It should be understood that the following drawings show merely some embodiments of the present application and therefore should not be considered as limiting the scope, and a person of ordinary skill in the art may still derive other related drawings from these drawings without creative efforts.

REFERENCE NUMERALS

Figure 1:
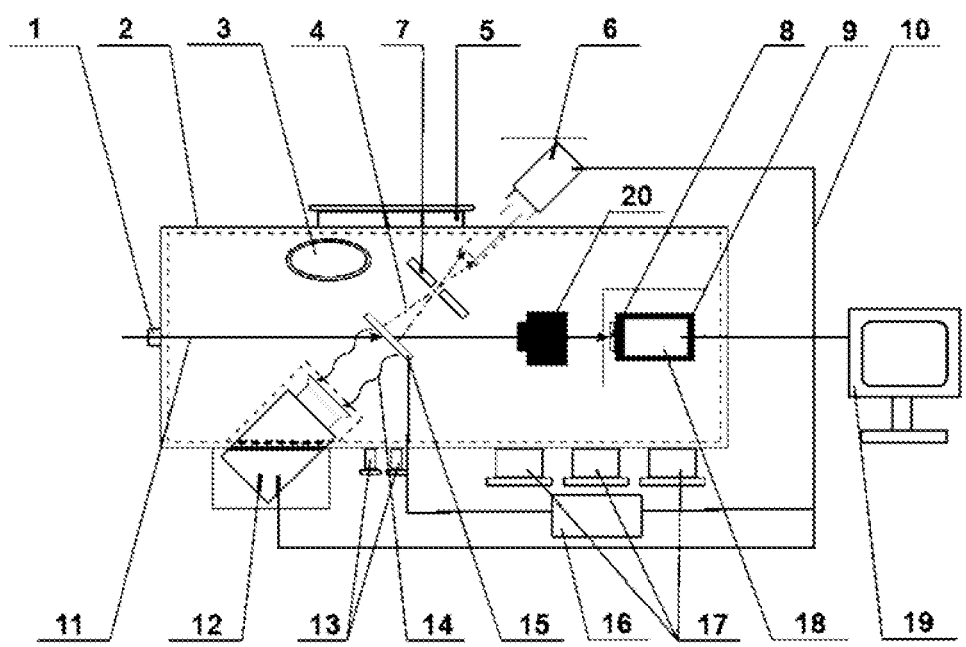
FIG. 1 is a schematic structural diagram of a multi-physical field measurement device for a metal solidification process according to an embodiment of the present application.

1—light-through hole; 2—housing; 3—viewing window; 4—fluorescent signal; 5—cabin door; 6—silicon drift X-ray detector; 7—baffle; 8—scintillator; 9—optical lens group; 10—apparatus cable; 11—X-ray; 12—infrared thermal imager; 13—KF flange; 14—infrared signal; 15—sample sheet; 16—controller; 17—wiring flange; 18—CMOS camera; 19—PC terminal; 20—diffraction detector; 21—micro-motion displacement platform; 22—third window; 23—fifth window; 24—fourth window; 25—heater; 26—cooling assembly; 27—hanging head; 28—housing body; 29—first window; 30—sliding rail; 31—sliding block; 32—fixing hole; 33—first mounting seat; 34—first base plate; 35—inner connecting frame; 36—outer side plate; 37—strip-shaped hole; 38—first connecting hole; 39—first fixing piece; 40—second connecting hole; 41—second fixing piece; 42—second window; 43—second mounting seat; 44—third concave flange; 45—third through hole; 46—third mounting seat; 47—fourth concave flange; 48—fourth through hole; 49—fourth mounting seat; 50—fifth mounting seat; 51—second base plate; 52—light inlet flange.

DETAILED DESCRIPTION OF THE EMBODIMENTS

The inventor finds in a research process that real-time in-situ measurement of plural physical fields in a metal solidification process has the following difficulties.

1. Joint measurement of plural physical fields is an interdiscipline and has complexity. Measurement of element distribution involves spectroscopy; crystal strain measurement involves material science; selection of radiant energy involves physics; design of an optical path involves optics; alloy solidification experiment involves material science;

and use of a device involves mechanical design. How to design a multi-physical field measurement device in consideration of characteristics of individual subjects is a worldwide problem.

2. Combined use and control of detectors. Detectors have different data collection principles and ways, and also different collection frequencies during data collection, and independent control devices are required to be used for simultaneously performing trigger control and signal collection on all the detectors.

3. Time calibration and space calibration of detectors. Since space positions of the detectors relative to a sample are different when the detectors work, space calibration is required; and since the detectors have different collection frequencies, time calibration is required to be performed on the detectors, and specifically, the detectors are synchronously triggered, and upper or lower collection frequencies are aligned.

4. Detector manufacturers do not support opening of data collection interfaces, the data collection interfaces are technological secrets of the detector manufacturers, and development of the data collection interfaces of the detectors is difficult; and measurement of plural physical fields involves connection of a large number of transmission devices and lines, which requires specially designed connection way.

5. A detector of a synchronous radiation ray station is deposited inside the ray station, and used on demand, solidification experiment is often exposed in atmosphere, and a cavity which can contain all components is required to be designed, is required to have leakproofness and stability, and meanwhile has a cooling device, so as to provide a suitable working environment for solidification of the sample and the detector.

Based on the above analysis, the inventors proposed a multi-physical field measurement device for a metal solidification process based on a third generation synchronous radiation light source in conjunction with combined use of a diffraction detector 20, an X-ray absorption imager, an infrared thermal imaging detector and an X-ray fluorescent detector. The multi-physical field measurement device for a metal solidification process creatively incorporates a vacuum water-cooling cavity system, a sample temperature control system, a sample transmission system, a synchronous X-radiation detector system (an X-ray absorption imaging detector, the X-ray fluorescent detector, the infrared thermal imaging detector and the diffraction detector 20) and a data collection and analysis system to perform in-situ real-time measurement of a temperature field, a solute field, a strain field and a flow field in the metal solidification process, which is used for analysis of a solidification structure evolution rule and verification of a solidification theory, so as to help to explore a new theoretical model.

In addition, in order to enable signals emitted by the sample to be detected by the various detectors at different positions, a sheet-like sample sheet, i.e., the sample sheet 15, is generally used for measurement.

The technical solutions in the embodiments of the present application are described with reference to the drawings in the embodiments of the present application.

To make the objectives, technical solutions and advantages of the embodiments of the present application clearer, the technical solutions in the embodiments of the present application are clearly and completely described with reference to the drawings in the embodiments of the present application, and apparently, the described embodiments are not all but a part of the embodiments of the present application. Generally, the components of the embodiments of the present application described and illustrated in the drawings herein may be arranged and designed in a variety of different configurations.

Accordingly, the following detailed description of the embodiments of the present application provided in the drawings is not intended to limit the scope of protection of the present application, but only represents selected embodiments of the present application. All other embodiments obtained by a person of ordinary skill in the art based on the embodiments of the present application without creative efforts shall fall within the protection scope of the present application.

It should be noted that similar reference signs and letters denote similar items in the following drawings. Therefore, once a certain item is defined in one figure, it does not need to be further defined and explained in the subsequent figures.

In descriptions of the present application, it should be noted that, directions or positional relationships indicated by terms "upper", "lower", "left", "right", "inner", "outer", etc. are based on orientations or positional relationships shown in the drawings, or orientations or positional relationships of conventional placement of the product according to the present application in use, and they are used only for describing the present application and for simplifying the description, but do not indicate or imply that an indicated device or element must have a specific orientation or be constructed and operated in a specific orientation. Therefore, it cannot be understood as a limitation on the present application.

In the description of the present application, it still should be noted that unless specified or limited otherwise, the terms "provided", "mounted", and "connected" and the like are used broadly, and may be, for example, fixed connection, detachable connection, or integral connection; may also be mechanical or electrical connection; may also be direct connection or indirect connection via intermediate media; may also be inner communication between two elements. The specific meanings of above terms in the present application can be understood by those skilled in the art according to specific situations.

Figure 2:
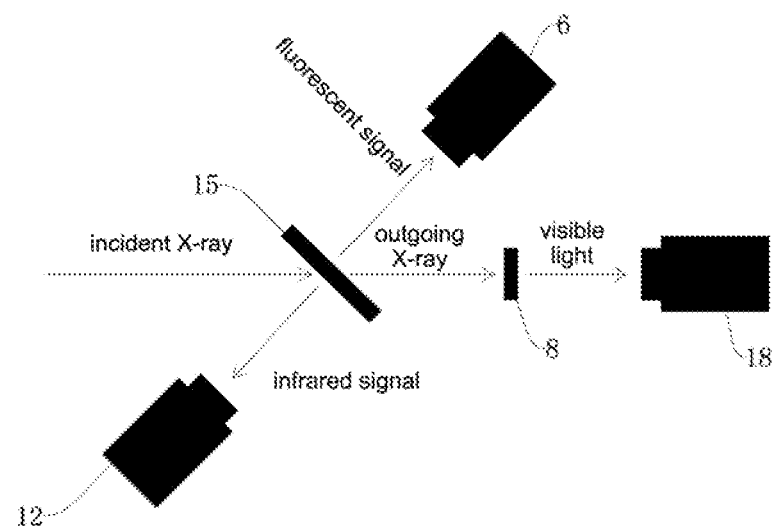
FIG. 2 is an optical path diagram of the multi-physical field measurement device for a metal solidification process according to the embodiment of the present application.
Figure 3:
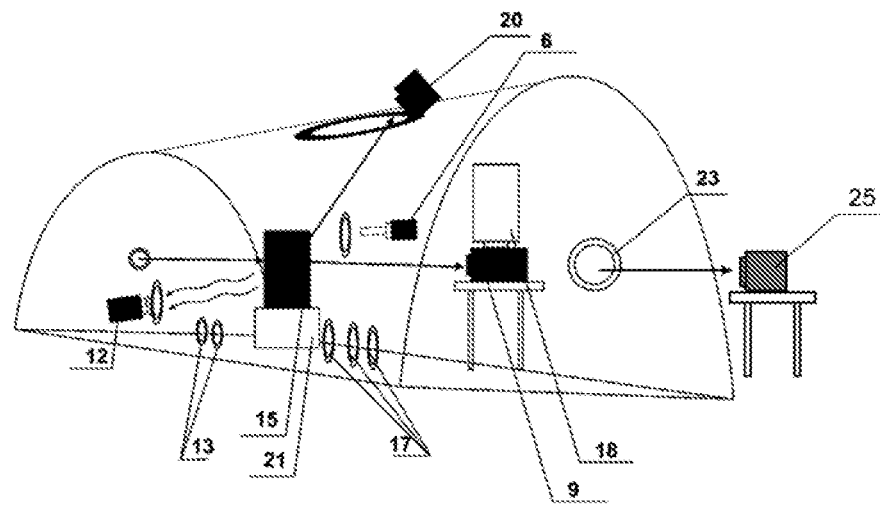
FIG. 3 is a schematic structural diagram of FIG. 1 from another angle.

Referring to FIGS. 1, 2 and 3, an embodiment of the present application provides a multi-physical field measurement device for a metal solidification process, including:

(1) vacuum water-cooling cavity system:

a housing 2 forming a cavity is designed in the embodiment of the present application, has leakproofness, and overcomes a defect that the solidification experiment in the prior synchronous radiation ray station is often exposed in the atmosphere.

The housing 2 is made of stainless steel which has stability, can resist a pressure of $10^{-5}$ to $10^6$ Pa and a high temperature, and can better ensure a vacuum sealing performance compared with carbon steel; corners of the housing 2 are rounded to prevent a person from being cut, and a front end and a rear end of the housing 2 are provided with two hanging heads 27 in total which facilitate assembly and disassembly of the housing as well as movement of the housing to adjust a position thereof; and an outer surface of the housing 2 is made of a polished material or subjected to polishing treatment, and an inner surface of the housing is made of a frosted material or subjected to frosting treatment, such that the inner surface of the cavity is a frosted surface with certain roughness, thus avoiding that the X-ray 11 is reflected to the infrared thermal imaging detector to influence a detection result.

The housing 2 is provided with a light-through hole 1 for allowing the external X-ray 11 to be emitted into the inside of the housing 2, and specifically, the front end of the housing 2 is provided with the light-through hole 1, such that the X-ray 11 can enter the closed cavity. In order to ensure leakproofness of the cavity, the light-through hole 1 is sealed by a Kapton film (a polypyromellitimide film), which allows the X-ray 11 to pass therethrough, reduces absorption of the X-ray 11, and can maintain the vacuum sealing performance. After experimental tests, the Kapton film can have such strength that the film is not damaged during vacuumizing, and the Kapton film has good stability.

In the embodiment of the present application, the X-ray 11 comes from a synchronous radiation light source, and ray energy and a spot size are adjustable. Due to remarkable advantages of high energy, high brightness, high temporal-spatial resolution, excellent monochromaticity, or the like, the third generation synchronous radiation light source can be used for intuitively and accurately researching element distribution, crystal growth and a dynamic structure evolution process in the metal solidification process. The embodiment of the present application can be applied to the Shanghai Synchrotron Radiation Facility, of which a photon energy region can reach 0.1 to 40 keV. For example, the device according to the embodiment of the present application is placed in a ray station of the Shanghai Synchrotron Radiation Facility for use, so as to obtain the X-ray 11; or can also be applied to photons in other energy regions, such as Japanese SPring-8, American APS, European ESRF, or the like.

A cooling assembly 26 (see FIG. 11) for reducing an internal temperature of the housing 2 is further designed in the embodiment of the present application, so as to provide a suitable working environment for solidification of the sample and the detector. Optionally, the cooling assembly 26 is a circulating water path provided inside the housing 2, and is used for cooling the cavity made of a metal material, so as to reduce an influence of an over-high internal temperature of the cavity on the solidification process, with the over-high internal temperature being caused by the sealing of the cavity, and meanwhile reduce an influence on measurement of a real sample temperature by an infrared thermometer.

In order to avoid that the sample is oxidized in a thermal process to generate an oxide skin, thus influencing a detection result, the cavity is required to be vacuum or protective atmosphere (argon gas, helium gas, or the like) is introduced into the cavity. In the embodiment of the present application, a gas flowmeter and a vacuum pump are connected externally to the cavity, and specifically, the vacuum pump is provided outside the housing 2 and communicated with the housing 2, and the gas flowmeter is provided on a communication pipeline.

The housing 2 is provided with a viewing window 3, the viewing window 3 is sealed by toughened quartz glass, which has good hardness, good strength, and facilitates manual observation. The housing 2 is provided with an openable cabin door 5. Specifically, a left side of the cavity is provided with a high-temperature resistant glass window as the viewing window 3, and a condition in the cavity can be conveniently observed by the arrangement of the viewing window 3, such that adjustment can be timely carried out, and the cabin door 5 is provided to facilitate adjustment of the sample sheet 15.

The housing 2 is provided with windows for transmitting signals received by detectors and a plurality of flanges for providing interfaces and line channels.

(2) sample temperature control system:

in the embodiment of the present application, the to-be-detected sample sheet 15 is fixed and heated by a heater 25 (i.e., a heating table for heating the sample sheet 15) (see FIG. 10), and the heater 25 is provided inside the housing 2 and located behind the light-through hole 1 along the X-ray 11. It should be noted that in the present application, "front" and "rear" refer to an order of arrangement along the X-ray 11 direction (irradiation from front to rear).

In the embodiment of the present application, the sample sheet 15 vertically stands on the heating table. As an implementation, for the vertical sample sheet 15, the heater 25 includes heating plates provided at an upper end and a lower end of the sample sheet 15 as well as upper and lower thermocouples pasted to the sample sheet 15 and used for measuring a temperature, wherein the heating plates are wired to corresponding power control devices respectively, and the two thermocouples and the power control devices are connected to a two-channel PID temperature control device.

A temperature range of heating of the sample sheet 15 by the heater 25 in the embodiment of the present application may be from a room temperature to 1,400° C. (infrared heating), and therefore, the metal sample has a wide selection range, and usually, materials with a melting point below 1,400° C., such as metal aluminum, copper, zinc, tin, gold, silver, alloy thereof, etc., and other non-metal crystals, can be selected. Examples of the metal materials may include: copper with a melting point of about 1,083° C.; gold with a melting point of about 1,064° C.; aluminum with a melting point of about 660° C.; magnesium with a melting point of about 648.8° C.; lead with a melting point of about 328° C.; silver with a melting point of about 962° C.; and tin with a melting point of about 232° C.; and examples of metal multi-element alloy may include: various kinds of cast iron with melting points of about 1,200° C.; ferrosilicon with a melting point of about 1,300° C.; high-carbon ferromanganese with a melting point of about 1,250-1,300° C.; medium-carbon ferromanganese with a melting point of about 1,310° C.; silico-calcium with a melting point of about 1,000-1,245° C.; ferroboron with a melting point of about 1,380° C.; ferro-aluminium with a melting point of about 1,150° C.; an aluminum ingot with a melting point of about 660° C.; and cerium lanthanum rare earth with a melting point of about 800-1,000° C.

(3) sample transmission system:

a micro-motion displacement platform 21 provided below the heater 25 is further designed in the embodiment of the present application and used for moving the heater 25 and changing the position of the sample sheet 15 fixed thereby. Mechanical transmission stability of the micro-motion displacement platform 21 is high, a nano electric motor with high maturity is adopted for mechanical transmission, and hardware is adopted to trigger a pulse controlled switch module, thus avoiding a problem of unmatched transmission caused by line transmission and device response time in software control.

As an embodiment, the micro-motion displacement platform 21 is a three-axis (XYZ directions) micro-motion displacement platform, and is used for adjusting a spatial position of the sample sheet 15, such that an included angle of 45° is formed between the sample sheet 15 and the incident X-ray 11, which facilitates inter-view geometric correction between the sample sheet and the X-ray 11 absorption imaging detector; and two surfaces of the sample sheet 15 directly face the X-ray fluorescent detector and the infrared thermal imaging detector to realize detection. As an example, a Z-axis elevating platform of the micro-motion displacement platform 21 has a model of PZS-90-11016, and a Y-axis moving platform has a model of PPS-60-22016. An infrared thermal imager 12 (infrared detector) is perpendicular to the surface of the sample sheet 15, and the fluorescent detector (silicon drift X-ray detector 6) is perpendicular to the surface of the sample sheet 15.

The multi-physical field measurement device for a metal solidification process according to the embodiment of the present application can realize trans-scale research on a sample structure. Specifically, the heating table (heater 25) mounted with the sample sheet 15 is placed on the micro-motion displacement platform 21 (kohzu) and fixed by bolts, and the micro-motion displacement platform 21 is controlled by a PC terminal 19 to move the sample sheet 15, such that different portions of the sample sheet 15 in an XZ direction can be scanned by the detectors, and trans-scale in-situ real-time quantitative characterization of evolution of the metal solidification structure from nanometer to millimeter is realized. Factors affecting the characterization range include: 1. pixel size (resolution) of detector itself: the smaller the CCD resolution is, the more specific the details which can be detected is, and the smaller the CCD view field (maximum lateral size) is. When a CCD imaging detector is applied in conjunction with an optical magnifying lens group, a minimum detectable range is 0.19 µm, i.e., about 190 nm, 2. spot size of ray station where the device is located: a minimum characterization range of the spot of the imaging ray station limited at the imaging ray station is 0.19 µm, i.e., about 190 nm, and 3. use of optical amplification system. Typically, the trans-scale characterization range is from 190 nm to 0.5 mm.

(4) synchronous X-radiation detector system:
in the embodiment of the present application, the detectors with appropriate parameters are selected according to rapidity, complexity and a microcosmic property of the metal solidification process, and specifically include the X-ray absorption imaging detector for measuring a flow field in the metal solidification process, the X-ray fluorescent detector for measuring a solute field in the metal solidification process, the infrared thermal imaging detector for measuring a temperature field in the metal solidification process, and the diffraction detector 20 for measuring a strain field in the metal solidification process, such that measurement of a plurality of important parameters in the solidification theory, such as the temperature field, the solute field, the flow field, or the like, in the metal solidification process can be achieved.

① Diffraction detector 20: the diffraction detector 20 is used for receiving the X-ray 11 which penetrates through the sample sheet 15 and is scattered, and can be used for qualitative analysis of a matter structure, determination of a lattice constant, stress measurement, or the like.

In the above, the diffraction detector 20 is usually provided on a top of the cavity, an angle between a connecting line of the diffraction detector 20 and the sample sheet 15 and the incident X-ray 11 is greater than 5 degrees, about 5-45 degrees, and a wide-angle scattered signal emitted by the sample sheet 15 is detected; meanwhile, the small-angle scattering detector 20 is located in a tail region of the cavity and can detect a small-angle scattered signal emitted by the sample sheet 15. Trans-scale structure analysis is realized: the size of the spot is controlled by the Shanghai Synchrotron Radiation Facility, the X-ray 11 is focused on a micro region of the sample sheet 15, structural information of the micro region of the sample sheet 15 is obtained by the diffraction detector 20, and meanwhile, the micro-motion displacement platform 21 is linked to scan different micro regions, such that structural information of the whole sample sheet 15 can be obtained.

In the embodiment of the present application, the diffraction detector 20 with a specification of PILATUS3 X 300K can be selected, and PILATUS3 X 300K is an ideal detector for SAXS or coherent diffraction imaging measurement. It has 487×619 pixels, allows coverage of large diffraction and scattering angles and meanwhile maintains high reciprocal spatial resolution, which facilitates better sampling in both technologies. This enables data of an imaged object with a large number of resolution elements to be recorded, in particular for coherent diffraction imaging. It also has excellent stability of a water-cooled detector, can determine and reduce solvent scattering in SAXS measurement, and has optimal precision and accuracy, even over long exposure time. Furthermore, people can take advantage of optional vacuum compatibility of the detector to completely eliminate air scattering.

The diffraction detector 20 has a large sensitive region; a pixel size is 172 µm×172 µm, and a quite tiny region can be detected; a total pixel number is 487×619=301,453, and the spatial resolution is high; a proportion of an invalid region is 5.5%, a proportion of a pixel-defective region is less than 0.03%, and an effective utilization rate of the detector is high; a maximum collection rate is 500 Hz, reading time is 0.95 ms, the reading time is short, and continuous images with small collection time intervals can be conveniently collected; and threshold energy is 2.7 keV-18 keV, and many kinds of elements can be detected.

Strain field: if microscopic stress is different between crystalline grains or even between parts in one crystalline grain, spacing between crystal faces in some regions increases, spacing between the crystal faces in some regions decreases, and as a result, diffracted rays are displaced in different directions, and diffusion of the diffraction rays is widened, such that the diffraction detector 20 can be used for qualitative analysis of the matter structure, determination of the lattice constant, stress measurement, or the like.

② X-ray absorption imaging detector: specifically, a CMOS camera 18 (CMOS detector or other imaging detectors, such as a ccd camera) and a scintillator 8 are adopted, the CMOS camera 18 (imaging camera) is located behind the heater 25 along the X-ray 11, the scintillator 8 is located behind the heater 25 along the X-ray 11 and in front of the imaging detector (CMOS camera 18), the X-ray 11 penetrating through the sample sheet 15 passes through the scintillator 8 to form a visible light signal, and the imaging detector (CMOS camera 18) is used for receiving the visible light signal penetrating through the sample sheet 15 to realize absorption imaging and phase contrast imaging. Since an included angle of about 45° is formed between the sample sheet 15 and the incident X-ray 11 and the imaging detector (CMOS camera 18) directly faces the incident X-ray 11, an included angle of about 45° is formed between the imaging detector (CMOS camera 18) and the sample sheet 15. It should be understood that the included angle in the present application may have a certain deviation within a certain range, for example, 40-50°, and is adjusted and selected according to actual conditions.

As an embodiment, an optical lens group 9 for amplifying the visible light signal and reflecting the visible light signal to be received by the imaging detector (CMOS camera 18) is further included, the optical lens group 9 is located behind the scintillator 8 along the X-ray 11, the imaging detector (CMOS camera 18) is located above the optical lens group 9, and the optical lens group 9 directly faces the incident X-ray 11, is at 45° relative to the optical path of the incident X-ray 11 and reflects the light upwards to be received by the imaging detector (CMOS camera 18).

In the embodiment of the present application, an X-ray imaging detector (receiving visible light) with a model of Andor Zyla 4.2Plus can be selected as the imaging detector (CMOS camera 18), the X-ray imaging detector has a maximum collection frequency of 100 frames per second and electronic reading noise of only 0.9e, and is a CMOS detector with lowest reading noise which is significantly lower than that of any CCD detector; a USB3.0 frame rate is 53 fps (full frame), and 100 fps (full frame) can be maintained through CameraLink, such that continuous images with small collection time intervals can be collected conveniently; and it has resolution of 2048×2048 pixels (4,200,000-pixel sensor format) and 6.5-μm pixels, and can provide extremely sharp resolution in an 18.8-mm diagonal view field range.

Flow field: tracer particles are added into the sample sheet 15, the tracer particles flow in molten liquid under the action of heat flow, solute diffusion, or the like in the solidification process of the sample sheet 15, the trace of the particles is obtained through the imaging detector, and in conjunction with a PTV speed measurement technology, speed distribution information on a large number of space points can be recorded in the same transient state, such that abundant flow field space structures and flow characteristics can be provided, and the flow field of the sample solidification process can be obtained. The device according to the embodiment of the present application is utilized to measure the flow field in the sample solidification process, and has advantages of a transient state and multiple points.

③ X-ray fluorescent detector: specifically, a silicon drift X-ray detector 6 is used as the X-ray fluorescent detector, and the silicon drift X-ray detector 6 is located on one side of the X-ray 11, is used for receiving a fluorescent signal 4 emitted by interaction between the X-ray 11 and the sample sheet 15, and can be used for qualitative and quantitative analysis of elements of the matter. It should be understood that in other embodiments, other fluorescent detectors may also be employed.

As an embodiment, a baffle 7 with a small hole provided between the heater 25 and the fluorescent detector (silicon drift X-ray detector 6) is further included, and the fluorescent signal 4 is received by the silicon drift X-ray detector 6 through the small hole. Trans-scale structure analysis is realized: the size of the spot is reduced through the small hole, the rays are focused in the micro region, and meanwhile, the micro-motion displacement platform 21 is linked to scan different micro regions, such that information of the whole sample sheet 15 can be obtained.

In the embodiment of the present application, a silicon drift X-ray detector 6 with a model of Vortex®-ME4 (converting the X-ray 11 into visible light) can be selected as the silicon drift X-ray detector 6, and it has a sensitive thickness thereof is 3.5 mm, and can measure many types of elements; it is a four-element silicon drift X-ray detector 6, and has a total effective area (4SDD) of 120 mm-200 mm, and a large detection area; and FWHM (eV) is 5.9 keV, and energy resolution is high.

Solute field: element distribution of the sample micro region is measured using the silicon drift X-ray detector 6 to obtain the solute field in the sample solidification process.

In other embodiments, an array detector with a photon energy resolving capability can be also used as the X-ray fluorescent detector, which can directly measure the element distribution, for example, a detector with a model of HEXITEC; while when the silicon drift X-ray detector 6 of Vortex®-ME4 measures the element distribution, the micro-motion displacement platform 21 is required to be combined to scan the sample.

The detector with a model of HEXITEC measures energy and positions of photons in the range of 4-200 keV. Each of 80×80 pixels provides a full energy spectrum, and average energy resolution of 800 eV FWHM may be reached when incident photon energy is 60 keV; a frame rate is 9 kHz, a data rate is 5M photons/sec, a thickness is 1 mm, and a substrate is made of CdTe.

④ Infrared thermal imaging detector: specifically, an infrared thermal imager 12 (infrared thermometer) including a lens group is used as the infrared thermal imaging detector, and the infrared thermal imager 12 is located on the other side of the X-ray 11 and used for receiving the infrared signal 14 emitted by the sample sheet 15.

In the embodiment of the present application, a refrigeration-type medium wave infrared thermal imager with a host model of X6520sc can be selected as the infrared thermal imager 12, and has a pixel size of 15 μm, resolution of 640×512 pixels and a highest frame rate of 145 frames per second, and the continuous images with small collection time intervals can be conveniently collected; and a temperature difference less than 25 mK (typical 18 mK) can be distinguished, thermal sensitivity is high, temperature measurement precision is ±1° C./1%, and it is quite suitable for measuring temperature distribution in the metal solidification process.

Temperature field: the micro-region temperature distribution in the sample solidification process is detected by the infrared thermal imager 12, and the temperature field can be directly obtained.

Figure 4:
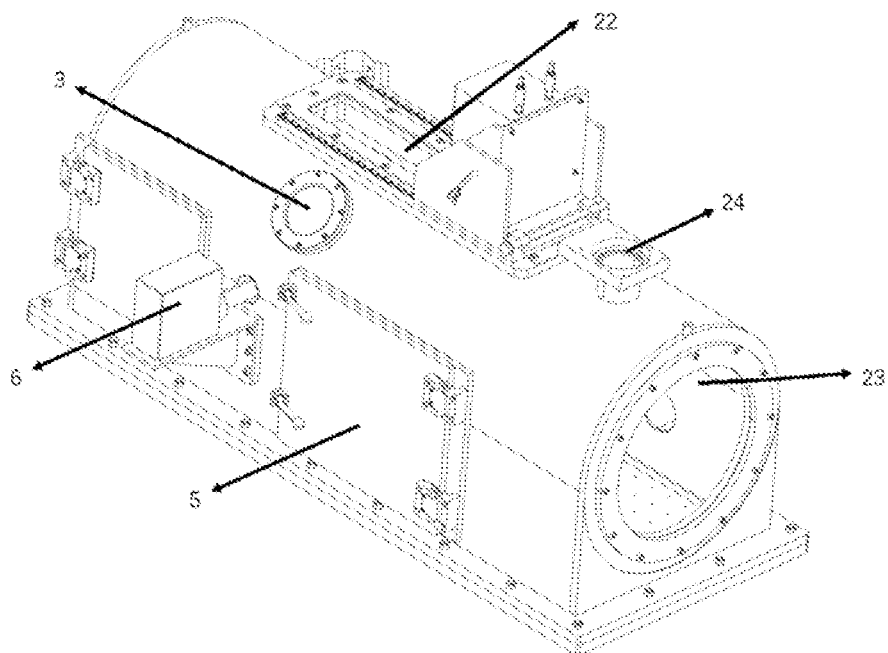
FIG. 4 is a schematic structural diagram of a housing part of FIG. 1.

Since the diffraction detector 20, the imaging detector (CMOS camera 18), the fluorescent detector (silicon drift X-ray detector 6) and the infrared thermal imager 12 in the example of the present application are all located outside the housing 2, in order not to affect reception of the signal inside the housing 2 by the detectors, in combination with the characteristics of each detector, windows for allowing the signals to pass therethrough are provided at corresponding positions on the housing 2. Specifically, referring to FIG. 4, a third window 22 is provided on the top of the housing 2 and used for placing the diffraction detector 20 at an external corresponding position, and the third window 22 is of a substantially long strip shape. In other embodiments, a fifth window 23 may be provided in the tail region of the housing 2 and used for placing the diffraction detector 20 at an external corresponding position, such that it can detect the small-angle scattered signal emitted from the sample sheet 15; the fifth window 23 is substantially circular and sealed with a Kapton film, such that the X-ray 11 can pass therethrough, and absorption of the X-ray 11 is reduced; and meanwhile, the Kapton film has such strength that the film can be not damaged during vacuumizing, the Kapton film has better stability, and a sealing performance in the cavity is ensured.

In addition, a window which extends into the cavity is provided on the right side of the housing 2 to place the infrared thermal imager 12, the infrared thermal imager 12 directly faces the front surface of the sample sheet 15 and receives the infrared signal 14 sent by the sample sheet 15, and calcium fluoride optical glass is adopted for the window, such that the infrared signal 14 can penetrate through the window while leakproofness is ensured; a window which extends into the cavity is provided on the left side of the housing 2 to place the fluorescent detector (silicon drift X-ray detector 6), the fluorescent detector (silicon drift X-ray detector 6) directly faces the reverse surface of the sample sheet 15 and receives the fluorescent signal 4 sent by the sample sheet 15, and the window is sealed by a Kapton film, such that the fluorescent signal 4 can pass through the window, and leakproofness in the cavity is ensured; and a fourth window 24 is also provided at the top of the housing 2 and used for placing the imaging detector (CMOS camera 18) to receive the visible light signal.

(5) Data collection and analysis system:

the data collection and analysis system further includes a PC terminal 19 and a controller 16 which are provided outside the housing 2, and the PC terminal 19 is connected with the diffraction detector 20, the imaging detector (CMOS camera 18), the fluorescent detector (silicon drift X-ray detector 6) and the infrared thermal imager 12 respectively. Data of each detector is transmitted through a gigabit Ethernet or even a ten-gigabit Ethernet and stored on the PC terminal 19, and real-time dynamic distribution of the plurality of physical fields, such as the temperature field, the solute field, the flow field, the stress field, or the like, is displayed on a display screen, such that data collection and visualization are realized. The controller 16 is connected with the heater, the micro-motion displacement platform 21 and the PC terminal 19. In one embodiment, the controller 16 further includes a power control device and a two-channel PID temperature control device connected to the heater 25.

The above apparatuses are connected by an apparatus cable 10, used for supplying power to the detectors and meanwhile connecting the detectors, such that the detectors can realize synchronous measurement after a synchronous control program runs. In addition, a plurality of flanges can be provided on the housing 2 to place different electric circuits, water paths and gas paths respectively, such that strong electricity and weak electricity of the device are separated, and the water path and the electric circuit are separated, thereby reducing potential safety hazards. In the above, a vacuum aviation plug may be adopted to guarantee a vacuum sealing performance, when the flange is used for placing the electric circuit, and a quick interface can be adopted to facilitate mounting, when the flange is used for placing the water path. In the present embodiment, the right side of the cavity is provided with two KF flanges 13 and three wiring flanges 17, the KF flanges 13 and the wiring flanges 17 provide interfaces to connect lines in the cavity to an exterior of the cavity, and meanwhile, leakproofness of the cavity is guaranteed.

Since the detectors have different data collection principles and ways, collection frequencies during data collection are different. In the embodiment of the present application, the independent controller 16 is used to perform trigger control and signal collection on all the detectors simultaneously. Since the detectors are located in different orientations when working, the controller 16 is used in the embodiment of the present application to perform time calibration and space calibration on the detectors. In the above, a method for realizing space calibration is as follows: since detection planes of the infrared thermal imager 12 and the fluorescent detector (silicon drift X-ray detector 6) are parallel to the sample sheet 15, the two detectors are spatially calibrated, and a stable ingredient is fixed at more than three points in the view field during an experiment, such that spatial calibration is performed. The imaging detector (CMOS camera 18) is required to transform an image view angle by using image processing.

The multi-physical field measurement device for a metal solidification process according to the embodiment of the present application realizes synchronous and quantitative measurement of the plural physical fields, such as the solute field, the strain field, the flow field, or the like. Information collection interfaces of all the detectors are opened, and mounting positions of the detectors are reasonably configured, such that the detectors can synchronously receive signals. In the embodiment of the present application, association detection devices for the multi-physical field coupling effects such as small-angle scattering, fluorescence, diffraction, imaging, or the like, are created to realize associated measurement of a coupling effect of the multiple physical fields of the solute field, the flow field, the temperature field, or the like, in the evolution process of the solidification structure, which can help to understand association of temperature, concentration, flow and pressure of continuous evolution from a microstructure to a macroscopic structure.

The multi-physical field measurement device for a metal solidification process has high time precision, space precision, temperature (heating and temperature measuring) precision, load applying precision, flow field precision and energy resolution precision. The device can reach the following indexes: lattice orientation and dendritic crystal stress characterization: dendritic crystal orientation and stress analysis in the solidification process is performed, and spatial resolution is 10 μm; a focusing size of incident light is greater than or equal to 2 μm×2 μm, and the light can be focused to the micro region of the sample sheet 15; imaging spatial resolution is 0.5 μm, and imaging time resolution is 5 ms; an ingredient detection limit reaches a ppm level, an effective measurement range is from No. 11 element sodium (Na) to No. 92 element (U), and spatial resolution is 1 μm; and melt structure characterization: small-angle scattering resolution is 0.1 nm-1,000 nm, scanning response time is 0.01 s, temperature measurement precision is 1° C.; flow field precision is 0.01 mm/s, a change of the solidification process in a detection time period is small, and large-area and quick scanning is required to be carried out in short time. The micro-motion platform is used for realizing two-dimensional (XY array motion) high-precision surface scanning, meeting 50-nm scanning precision, and pulse lattice scanning with a maximum stroke reaching 1 mm scale is performed; response time is less than 2 milliseconds; stress precision: a micro-load sample table meets requirements of tensile, compression and torsion load application with precision reaching an mN level, a maximum linear stroke is 2 mm, and a maximum torsion angle is 90 degrees.

Figure 5:
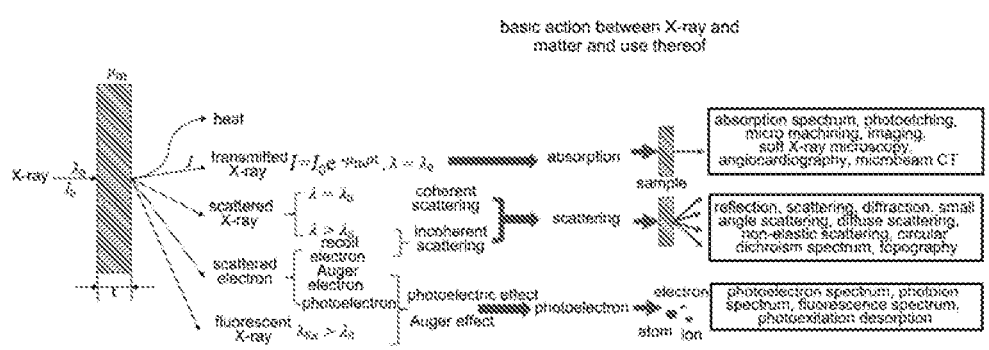
FIG. 5 is a schematic diagram of interaction between an incident X-ray and matter and a use thereof.
Figure 6:
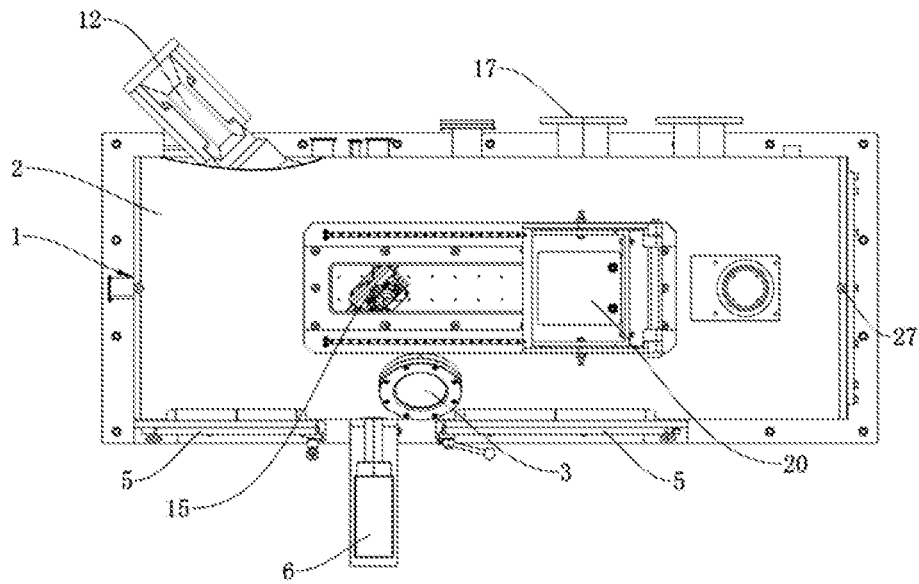
FIG. 6 is a top view of a multi-physical field measurement device for a metal solidification process according to an embodiment of the present application.
Figure 7:
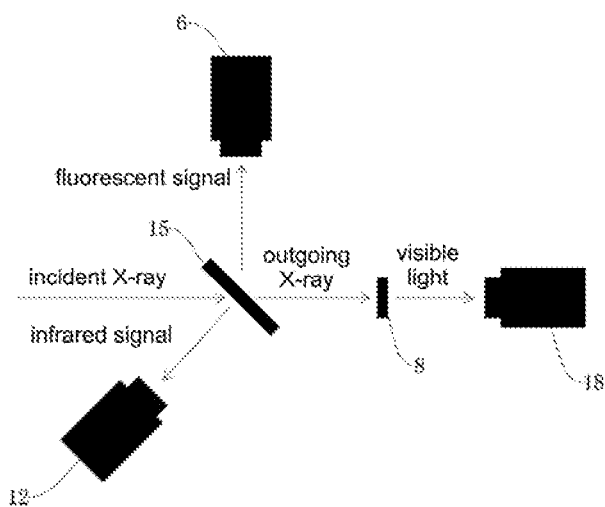
FIG. 7 is an optical path diagram of a multi-physical field measurement device for a metal solidification process according to an embodiment of the present application.

It should be noted that the schematic diagram of the interaction between the incident X-ray 11 and matter of the sample sheet 15 and the use thereof is shown in FIG. 5: the transmitted X-ray is used as a signal source for absorption imaging, the scattered X-ray is used as a signal source for diffraction imaging, and the fluorescent X-ray is used as a signal source for fluorescent imaging.

The imaging detector (CMOS camera 18) and the incident light (X-ray 11) are in the same straight line, the scattering detector (diffraction detector 20) and the incident light (X-ray 11) form a certain included angle, and the fluorescent detector (silicon drift X-ray detector 6) and the incident light (X-ray 11) form a certain included angle.

With respect to diffraction of materials and the fluorescent signal 4, distinguishing thereof requires comparison of data collected at two different angles: the fluorescent signal 4 is an intrinsic property of constituent elements of the material, and does not vary with an angle, while diffraction is dependent on the angle, and therefore, a diffraction pattern obtained by the diffraction detector 20 (typically used in conjunction with a goniometer) is not interfered by the fluorescent signal 4.

Therefore, interference between each detector and the received signal thereof is avoided through the arrangement of the specific position of each detector in the present application: the imaging detector (CMOS camera 18) and the incident light (X-ray 11) are in the same straight line, the scattering detector (diffraction detector 20) and the incident light (X-ray 11) form a certain included angle, the fluorescent detector (silicon drift X-ray detector 6) and the incident light (X-ray 11) form a certain included angle, and the diffraction detector 20 is used in combination with the goniometer to avoid interference of the fluorescent signal 4.

The present application further provides a multi-physical field measurement system for a metal solidification process, including a multi-physical field measurement device for a metal solidification process, and an analysis device for analyzing multi-physical field data obtained by the multi-physical field measurement device for a metal solidification process, a PC terminal of the multi-physical field measurement device for a metal solidification process being connected with the analysis device.

The present application further provides a use of a multi-physical field measurement system for a metal solidification process in analysis of the metal solidification process.

An embodiment of the present application further provides a measurement method based on the multi-physical field measurement device for a metal solidification process, including the following steps.

The sample sheet 15 is vertically mounted on the heater 25 (heating table) and fixed; specifically, the sample sheet 15 is fixedly attached between two heating plates, and two K-type thermocouples are fixedly pasted between the heating plates and the sample sheet 15; then, the heater 25 mounted with the sample sheet 15 is fixed to the micro-motion displacement platform 21 inside the housing 2 through the cabin door 5.

The inside of the housing 2 is vacuumized or protective atmosphere (argon gas, helium gas, or the like) is introduced into the housing, thus avoiding that the sample is oxidized in the thermal process to generate an oxide skin, thus influencing subsequent detection.

The to-be-detected sample sheet 15 is heated to a molten state by the heating plates of the heater 25 and is kept at the temperature for a period of time, the X-ray 11 is adjusted to be emitted into the inside of the housing 2 through the light-through hole 1, and the position and the angle of the sample sheet 15 are adjusted by the micro-motion displacement platform 21, such that the X-ray 11 irradiates the sample sheet 15 at an included angle of 45 degrees to facilitate subsequent view field geometric correction of detection data of the imaging detector, and two surfaces (a front surface and a reverse surface) of the sample sheet 15 directly face the infrared thermal imager 12 and the fluorescent detector (the silicon drift X-ray detector 6) respectively.

The detectors are synchronously triggered 2-5 min before a heat preservation program is finished, and data is started to be collected:

the X-ray 11 irradiated on the sample sheet 15 interacts with matter, and after partial energy is absorbed, the X-ray 11 penetrating through the sample sheet 15 is irradiated on the scintillator 8 and converted into a visible light signal, which is then amplified and reflected by the optical lens group 9, and finally received by the imaging detector (CMOS camera 18), to obtain an image of dendritic crystal morphology of the solidification process of the sample sheet 15, and data is transmitted to and stored on the PC terminal 19 through Ethernet.

The X-ray 11 penetrating through the sample sheet 15 and scattered is received by the diffraction detector 20, so as to realize qualitative analysis, lattice constant determination and stress measurement of a matter structure.

The infrared signal 14 sent by the sample sheet 15 is received by the infrared thermal imager 12 which directly faces the front surface, the image is amplified by a long-distance working microscopic infrared lens, temperature measurement of the micro region of the sample sheet 15 is realized, final data is transmitted through the Ethernet and stored in the PC terminal 19, and real-time dynamic distribution of the temperature field is displayed on a display screen.

The X-ray 11 irradiated on the sample sheet 15 interacts with the sample sheet 15 to send a fluorescent signal 4, and the fluorescent signal is received by the fluorescent detector (silicon drift X-ray detector 6) directly facing the back surface of the sample sheet 15, such that quantitative measurement of element ingredients of the sample is realized, data is transmitted and stored in the PC terminal 19, and a real-time situation of the solute field is displayed on a display.

The technical solutions of the embodiments of the present application are specifically described below by specific examples.

Example 1

Referring to FIGS. 1, 2 and 3, the present example provided a method for measuring an experimental sample using the multi-physical field measurement device for a metal solidification process, the experimental sample was a sample sheet 15 made of alloy with Al and 15 wt. % of Cu, and a specific process was as follows.

The sample sheet 15 was fixed on the heating table and tightly attached between the two heating plates, and the two K-type thermocouples were ensured to be fixedly pasted between the heating plates and the sample sheet 15. The cabin door 5 on the side of the housing 2 was opened, and the heating table mounted with the sample sheet 15 was placed on the micro-motion displacement platform 21 and a base was fixed by bolts. The heating plates at the upper end and the lower end were wired to the corresponding power control devices, and then, the upper thermocouple, the lower thermocouple and the power control devices were connected to the two-channel PID temperature control device. Subsequently, wires were connected to outside of the housing 2 by the wiring flange 17, and the cabin door 5 was closed.

The vacuum pump was turned on to vacuumize the inside of the housing 2, and then, Ar gas was introduced into the inside as protective atmosphere.

A water-cooling circulating pump of the housing 2 was turned on, a power source of each detector was turned on, and the micro-motion displacement platform 21 was controlled by the PC terminal 19 to adjust the position of the sample sheet 15, such that the surface of the sample sheet was parallel to the fluorescent detector (silicon drift X-ray detector 6) and the infrared thermal imager 12 and formed an included angle of 45 degrees relative to the incident X-ray 11.

A synchrotron radiation X-ray 11 gate was opened to be in a light-through state, and energy of the X-ray 11 was adjusted to 15 keV. A program of a temperature control device was turned on at the PC terminal 19 to set a temperature control program. During the period, the position of the sample sheet 15 was finely adjusted by the micro-motion displacement platform 21 to find a proper view field position, and then, view fields of the detectors were corrected through the program, such that data spaces of the detectors were correlated with each other, and the data collection rate of each detector was set to 10 fps.

The detectors were synchronously triggered 2 min before the heat preservation program was finished, the X-ray penetrating through the sample was converted into a visible light signal, which was received by the imaging detector (CMOS camera 18) to obtain an image of dendritic crystal morphology of the sample solidification process; the X-ray which penetrated through the sample and was scattered was received by the diffraction detector, such that qualitative analysis, lattice constant determination and stress measurement of a matter structure were realized; the infrared signal sent by the sample was received by the infrared thermal imager to realize temperature measurement of the sample micro region; the X-ray irradiated on the sample interacted with the sample to emit a fluorescent signal, and the fluorescent signal was received by the fluorescent detector (silicon drift X-ray detector 6), such that quantitative measurement of the element ingredients of the sample was realized. Data was started to be collected, and data of multiple physical fields, such as the flow field, the temperature field, the solute field, or the like, was displayed in real time by a display of the PC terminal 19. After the solidification process was finished, each detector was turned off, and the temperature control program was stopped to cool the heating table.

The synchrotron radiation X-ray 11 gate was closed, and then, vacuumizing was released, and the sample sheet 15 and the device were tidied to finally obtain data of multiple physical fields, such as imaging image data, temperature field data, solute field data, or the like.

Example 2

Referring to FIGS. 1, 2 and 3, the present example provided a method for measuring an experimental sample using the multi-physical field measurement device for a metal solidification process, the experimental sample was a sample sheet 15 made of alloy with Al and 20 wt. % of Zn, and a specific process was as follows.

The sample sheet 15 was fixed on the heating table and tightly attached between the two heating plates, and the two K-type thermocouples were ensured to be fixedly pasted between the heating plates and the sample sheet 15 respectively. The cabin door 5 on the side of the housing 2 was opened, the heating table mounted with the sample sheet 15 was placed on the micro-motion displacement platform 21, and a base was fixed by bolts. The heating plates at the upper end and the lower end were wired to the corresponding power control devices, and then, the upper thermocouple, the lower thermocouple and the power control devices were connected to the two-channel PID temperature control device. Subsequently, wires were connected to outside of the housing 2 by the wiring flange 17, and the cabin door 5 was closed.

The vacuum pump was turned on to vacuumize the inside of the housing 2, and then, Ar gas was introduced into the inside as protective atmosphere.

A water-cooling circulating pump inside the housing 2 was turned on, a power source of each detector was turned on, and the micro-motion displacement platform 21 was controlled by the PC terminal 19 to adjust the position of the sample sheet 15, such that the surface of the sample sheet was parallel to the fluorescent detector (silicon drift X-ray detector 6) and the infrared thermal imager 12 and formed an included angle of 45 degrees relative to the incident X-ray 11.

A synchrotron radiation X-ray 11 gate was opened to be in a light-through state, and energy of the X-ray 11 was adjusted to 18 keV. A program of a temperature control device was turned on at the PC terminal 19 to set a temperature control program. During the period, the position of the sample sheet 15 was finely adjusted to find a proper view field position, and then, view fields of the detectors were corrected through the program, such that data spaces of the detectors were correlated with each other, and the data collection rate of each detector was set to 10 fps.

The detectors were synchronously triggered 2 min before the heat preservation program was finished, data was started to be collected, and data of multiple physical fields, such as the flow field, the temperature field, the solute field, or the like, was displayed in real time by a display of the PC terminal 19. After the solidification process was finished, each detector was turned off, and the temperature control program was stopped to cool the heating table.

The synchrotron radiation X-ray 11 gate was closed, and then, vacuumizing was released, and the sample sheet 15 and the device were tidied to finally obtain data of multiple physical fields, such as imaging image data, temperature field data, solute field data, or the like.

Example 3

Referring to FIGS. 1, 2 and 3, the present example provided a method for measuring an experimental sample using the multi-physical field measurement device for a metal solidification process, the experimental sample was a sample sheet 15 made of alloy with Al and 30 wt. % of Zn, and a specific process was as follows.

The sample sheet 15 was fixed on the heating table and tightly attached between the two heating plates, and the two K-type thermocouples were ensured to be fixedly pasted between the heating plates and the sample sheet 15, respectively. The cabin door 5 on the side of the housing 2 was opened, the heating table mounted with the sample sheet 15 was placed on the micro-motion displacement platform 21, and a base was fixed by bolts. The heating plates at the upper end and the lower end were wired to the corresponding power control devices, and then, the upper thermocouple, the lower thermocouple and the power control devices were connected to the two-channel PID temperature control device. Subsequently, wires were connected to outside of the housing 2 by the wiring flange 17, and the cabin door 5 was closed.

The vacuum pump was turned on to vacuumize the inside of the housing 2, and then, Ar gas was introduced into the inside as protective atmosphere.

A water-cooling circulating pump in the housing 2 was turned on, a power source of each detector was turned on, and the micro-motion displacement platform 21 was controlled by the PC terminal 19 to adjust the position of the sample sheet 15, such that the surface of the sample sheet was parallel to the fluorescent detector (silicon drift X-ray detector 6) and the infrared thermal imager 12 and formed an included angle of 45 degrees relative to the incident X-ray 11.

A synchrotron radiation X-ray 11 gate was opened to be in a light-through state, and energy of the X-ray 11 was adjusted to 25 keV. A program of a temperature control device was turned on at the PC terminal 19 to set a temperature control program. During the period, the position of the sample sheet 15 was finely adjusted to find a proper view field position, and then, view fields of the detectors were corrected through the program, such that data spaces of the detectors were correlated with each other, and the data collection rate of each detector was set to 10 fps.

The detectors were synchronously triggered 2 min before the heat preservation program was finished, data was started to be collected, and data of multiple physical fields, such as the flow field, the temperature field, the solute field, or the like, was displayed in real time by a display of the PC terminal 19. After the solidification process was finished, each detector was turned off, and the temperature control program was stopped to cool the heating table.

The synchrotron radiation X-ray 11 gate was closed, and then, vacuumizing was released, and the sample sheet 15 and the device were tidied to finally obtain data of multiple physical fields, such as imaging image data, temperature field data, solute field data, or the like.

In conclusion, the multi-physical field measurement device for a metal solidification process, and the housing and the measurement method thereof according to the embodiments of the present application can simultaneously measure in situ the temperature field, the solute field, the strain field, and the flow field in the metal solidification process.

Referring to FIGS. 6 to 11, an embodiment of the present application provides a multi-physical field measurement device for a metal solidification process, wherein an infrared thermal imager 12 (infrared detector) is perpendicular to a surface of a sample sheet 15, and an fluorescent detector (silicon drift X-ray detector 6) is provided perpendicular to the X-ray 11. In the above, the sample sheet 15 and the incident X-ray 11 form an included angle of 45 degrees, and an imaging detector (CMOS camera 18) and incident light (X-ray 11) are in the same straight line. With such an arrangement, detection effects of the fluorescent detector (silicon drift X-ray detector 6) and the infrared thermal imager 12 are optimal. Other parts are the same as or similar to those of the embodiments shown in FIGS. 1, 2 and 3.

Figure 8:
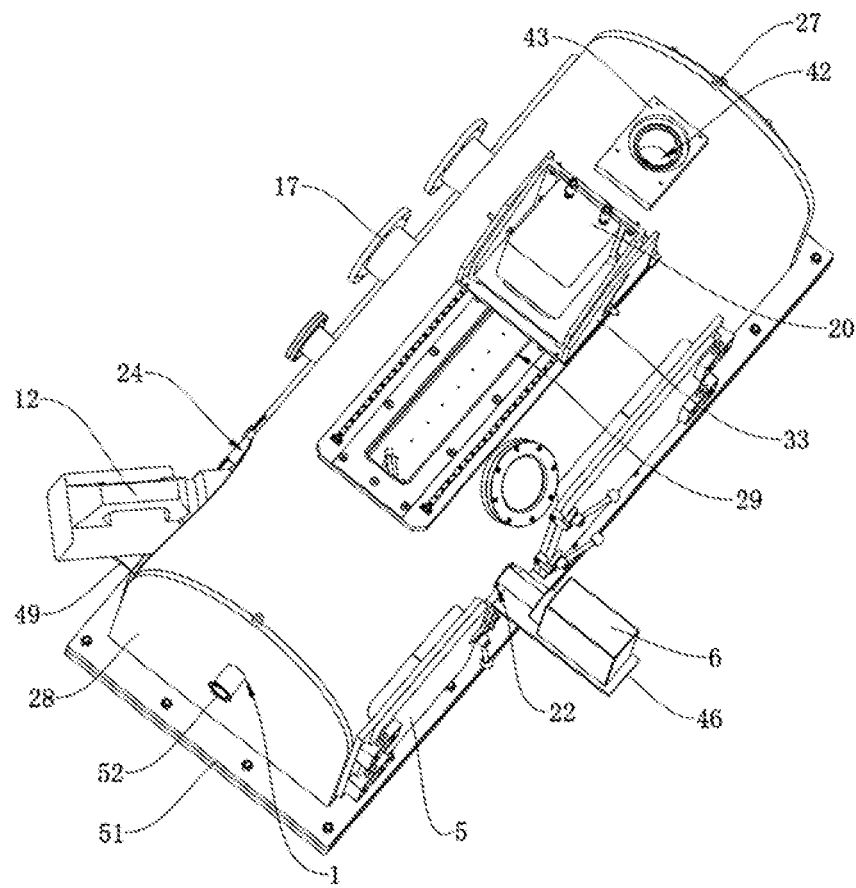
FIG. 8 is a schematic structural diagram of a multi-physical field measurement device for a metal solidification process according to an embodiment of the present application from another angle.

Referring to FIG. 8, the housing 2 of the measurement device includes: a housing body 28, wherein the housing body 28 is provided with a light-through hole 1 for allowing an external X-ray 11 to be emitted into the housing 2; a light inlet flange 52 extending out of the housing body 28 is provided on the housing body 28 and located at the light-through hole 1, the light inlet flange 52 is a KF vacuum quick-release flange and fixed on the housing body 28 by welding, bolting, or the like. The arrangement of the light inlet flange 52 is beneficial to processing and Kapton film pasting sealing, and facilitates maintenance, and when an orifice is deformed, a shape and a size of the required light-through hole 1 can be stably maintained only by replacing a new light inlet flange 52. In the above, the light-through hole 1 and the light inlet flange 52 are used for allowing entrance of the X-ray 11, and the smaller the size is, the better the effect is.

Figure 10:
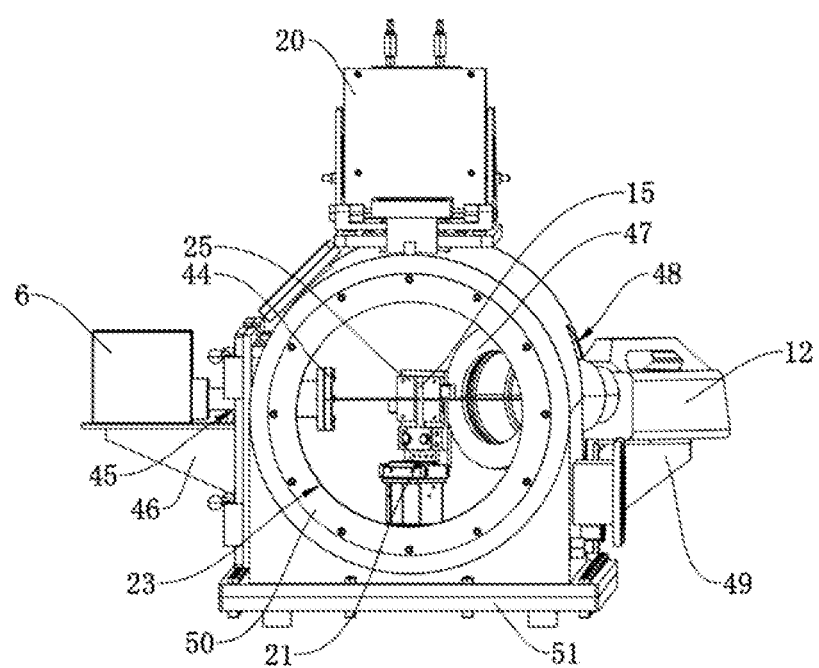
FIG. 10 is a schematic structural diagram of a multi-physical field measurement device for a metal solidification process according to an embodiment of the present application from another angle.

Referring to FIG. 10, a sample mounting table for mounting the sample sheet 15 is provided inside the housing body 28, and the sample mounting table in this embodiment is the micro-motion displacement platform 21 in the above-described embodiment. A heater 25 for heating the sample sheet 15 is further provided on the sample mounting table.

Referring to FIG. 8, a top of the housing body 28 is provided with a first window 29; a first mounting seat 33 for mounting a diffraction detector 20 is provided outside the housing body 28 and located at the first window 29. The diffraction detector 20 can detect a wide-angle scattered signal sent by the sample sheet 15. Specifically, referring to FIG. 11, the housing 2 of the measurement device further includes: a sliding rail 30 and a sliding block 31, wherein the sliding rail 30 is provided on an outer wall of the housing body 28 and located at the first window 29, the sliding rail 30 being provided with a plurality of fixing holes 32; and the sliding block 31 is movably provided on the sliding rail 30 and the sliding block 31 is connected with the first mounting seat 33, wherein the first mounting seat 33 is provided with a first connecting hole 38, and a first fixing piece 39 matched with any fixing hole 32 penetrates through the first connecting hole 38. In this embodiment, the first fixing piece 39 is a bolt, the first connecting hole 38 is an unthreaded hole, the fixing hole 32 is a threaded hole, and two sliding rails 30 and two sliding blocks 31 are provided. The sliding rails 30 may be connected to the housing body 28 directly or via flanges or connecting plates.

The first mounting seat 33 includes: a first base plate 34, an inner connecting frame 35 and at least one outer side plate 36, wherein the first base plate 34 is fixedly connected with the sliding block 31; the outer side plate 36 is fixedly connected with the first base plate 34, and the outer side plate 36 is provided with a strip-shaped hole 37; the inner connecting frame 35 is hinged to the first base plate 34, the inner connecting frame 35 is provided with a second connecting hole 40, and a second fixing piece 41 matched with the strip-shaped hole 37 penetrates through the second connecting hole 40. In this embodiment, the second fixing piece 41 is a bolt-nut assembly, the strip-shaped hole 37 and the second connecting hole 40 can be unthreaded holes, the first connecting hole 38 is provided in the first base plate 34, two outer side plates 36 are provided and located on two sides of the inner connecting frame 35 respectively, and two corresponding strip-shaped holes 37 and two corresponding second connecting holes 40 are provided.

In an operation process, the diffraction detector 20 is provided on the inner connecting frame 35, and both the inner connecting frame 35 and the first base plate 34 of the first mounting seat 33 are provided with through holes, for allowing the diffraction detector 20 to detect the wide-angle scattered signal emitted by the sample sheet 15. When a distance between the diffraction detector 20 and the sample sheet 15 is required to be adjusted, the first base plate 34, the inner connecting frame 35 and the diffraction detector 20 are moved by the sliding block 31, and when they are moved to a designated position, the first base plate 34 drives the diffraction detector 20 to be fixed, by the first fixing piece 39. When an angle between the diffraction detector 20 and the sample sheet 15 is required to be adjusted, the diffraction detector 20 on the inner connecting frame is rotated by rotating the inner connecting frame 35, and when it is moved to a specified angle, the inner connecting frame 35 drives the diffraction detector 20 to be fixed, by the second fixing piece 41.

In this embodiment, the linear movement of the first mounting seat 33 for mounting the diffraction detector 20 is achieved by the arrangement of the sliding rail 30 and the sliding block 31, and rotation of the first mounting seat 33 relative to the housing body 28 is realized through the arrangement of the first base plate 34, the inner connecting frame 35 and the outer side plate 36, such that the distance and angle between the diffraction detector 20 and the sample sheet 15 can be adjusted, which facilitates the diffraction detector 20 to measure the samples with different types and different ingredients, and improves the optical signal capturing range. In another embodiment, a ruler is attached to the sliding rail 30 and/or the outer side plate 36 to facilitate rapid finding and checking of the position and angle of the light.

Referring to FIG. 8, a second window 42 is also provided on the top of the housing body 28; a second mounting seat 43 for mounting the imaging detector (CMOS camera 18) is provided outside the housing body 28 and located at the second window 42. The second mounting seat 43 is a flange, and is connected to the housing body 28 by welding, bolt-fixing, or the like.

Referring to FIG. 8, a side of the housing body 28 is provided with a third window 22; a third mounting seat 46 for mounting the fluorescent detector (silicon drift X-ray detector 6) is provided outside the housing body 28 and located at the third window 22. The third mounting seat 46 is a bracket, and is connected to the housing body 28 by welding, bolt-fixing, or the like. Specifically, referring to FIG. 10, the third window 22 includes: a third concave flange 44 and a third through hole 45, the third through hole 45 being formed in the housing body 28, and the third concave flange 44 being located at the third through hole 45 and connected to the housing body 28 and extending inwards. In another embodiment, the third window 22 only includes the third through hole 45. In another embodiment, the third window 22 includes the third through hole 45 and an outer flange connected to the housing body 28 and extending outwards.

In the above, due to that the fluorescent detector (silicon drift X-ray detector 6) has a detection distance limit, an optimal detection distance of the fluorescent detector (silicon drift X-ray detector 6) is five to ten millimeters, and if a detection distance exceeds the range, problems of unclear images, inaccurate measurement, incapability of capturing signals, or the like, can occur. Therefore, in the embodiment, compared with a processing method in which a hole is directly drilled in the housing body 28 or the flange protrudes to an outer side of the housing, the concave flange processing method can better meet the requirement of the silicon drift X-ray detector 6 for the detection distance, improving efficiency.

Figure 9:
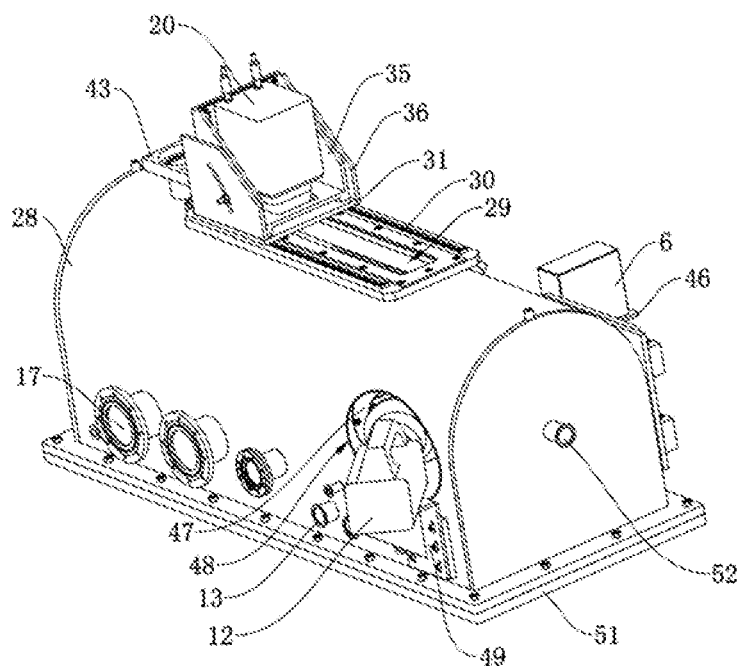
FIG. 9 is a schematic structural diagram of a multi-physical field measurement device for a metal solidification process according to an embodiment of the present application from another angle.

Referring to FIG. 9, the side of the housing body 28 is provided with a fourth window 24, and the fourth window 24 and the third window 22 are located at two sides of the light-through hole 1 respectively; a fourth mounting seat 49 for mounting the infrared thermal imager 12 is provided outside the housing body 28 and located at the fourth window 24. The fourth mounting seat 49 is a bracket, and is connected to the housing body 28 by welding, bolt-fixing, or the like. Specifically, referring to FIG. 10, the fourth window 24 includes: a fourth concave flange 47 and a fourth through hole 48, the fourth through hole 48 being formed in the housing body 28, and the fourth concave flange 47 being located at the fourth through hole 48 and connected to the housing body 28 and extending inwards. In another embodiment, the fourth window 24 only includes the fourth through hole 48. In another embodiment, the fourth window 24 includes the fourth through hole 48 and an outer flange connected to the housing body 28 and extending outwards.

In the above, the infrared thermal imager 12 has a detection distance limit, a detection distance of the infrared thermal imager 12 is less than or equal to 600 mm, a preferred range is 100 mm-298 mm, the infrared detector is damaged when the detection distance is too small, while loss of heat radiation is serious when the detection distance is too large, wherein a detection effect is optimal when the detection distance of the infrared thermal imager 12 is 298 mm. Therefore, in the embodiment, compared with a processing method in which a hole is directly drilled in the housing body 28 or the flange protrudes to an outer side of the housing, the concave flange processing method can better meet the requirement of the infrared thermal imager 12 for the detection distance, improving efficiency and prolonging a service life of the infrared detector.

Figure 11:
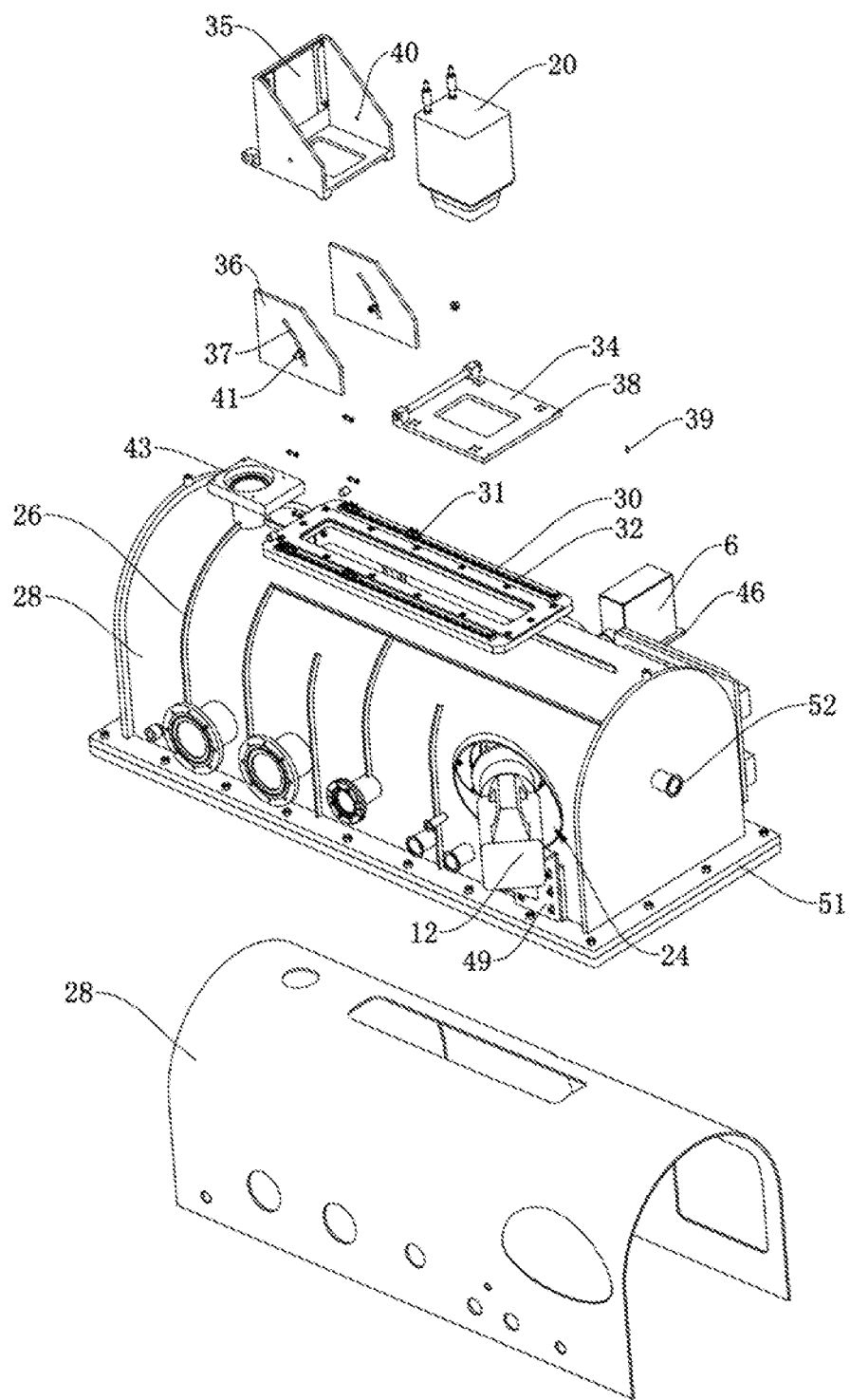
FIG. 11 is a schematic exploded diagram of a multi-physical field measurement device for a metal solidification process according to an embodiment of the present application.

Referring to FIGS. 9 and 11, the housing body 28 is provided with a fifth window 23, and the fifth window 23 is provided opposite to the light-through hole 1; a fifth mounting seat 50 for mounting the diffraction detector 20 is provided outside the housing body 28 and located at the fifth window 23. The diffraction detector 20 can detect a small-angle scattered signal sent by the sample sheet 15. The fifth mounting seat 50 is a flange, and is connected to the housing body 28 by welding, bolt-fixing, or the like. In the above, a diameter of the fifth window 23 can be designed as required as long as a detection requirement of small angle scattering is met. For example: (distance between the small angle detector and the center of the fifth window 23)/(distance between the to-be-detected sample and the small angle detector) <tan(6°).

Referring to FIGS. 6 to 11, a bottom of the housing body 28 is provided with a second base plate 51, and the second base plate 51 is consistent with the aperture and pitch of a general optical platform, facilitating adjustment of an optical path and fixing the sample heating table and/or stretching table, or the like. Each of the first window 29, the second window 42, the third window 22, the fourth window 24 and the fifth window 23 is provided with a light-transmitting film for sealing. The light-transmitting film is a Kapton film, such that a sealing requirement of the measurement device can be met. In the above, the fourth window 24 for mounting the infrared thermal imager 12 is further provided with infrared glass for filtering out optical signals other than the infrared signal 14. The infrared glass may have a 20 micron waveband.

Referring to FIG. 11, a housing wall of the housing body 28 is in a hollow structure and is provided with a cooling assembly 26, and the cooling assembly 26 is a circulating water path for cooling the cavity inside the metal housing 2.

The housing 2 of the measurement device may be applied to the multi-physical field measurement device for a metal solidification process provided in the first aspect and used for simultaneously measuring in situ the temperature field, the solute field, the strain field, and the flow field in the metal solidification process, thus realizing linked control during simultaneous measurement of multi-field detection instruments. The plurality of detection instruments are arranged according to scientific sizes in the space of the housing 2, such that a three-dimensional measuring effect of simultaneously measuring the plurality of physical fields can be achieved in the metal solidification process or a metal deformation process, biological macromolecule precipitation and other processes, facilitating a researcher in constructing a physical field three-dimensional model of the phase change process, and enabling a most precise and comprehensive scientific measuring result to be obtained in the same time.

Figure 12:
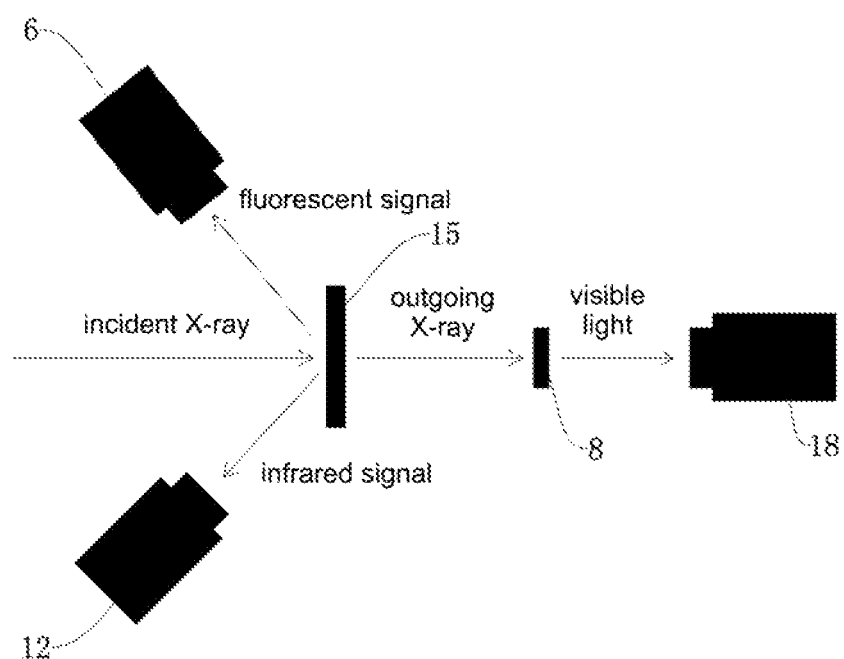
FIG. 12 is an optical path diagram of a multi-physical field measurement device for a metal solidification process according to an embodiment of the present application.

Referring to FIG. 12, an embodiment of the present application provides a multi-physical field measurement device for a metal solidification process, an incident direction of an X-ray 11 is perpendicular to a surface of a sample sheet 15, an imaging detector (CMOS camera 18) and the incident light (X-ray 11) are in the same straight line, an infrared thermal imager 12 (infrared detector) and the incident light (X-ray 11) form a certain included angle, and a fluorescent detector (silicon drift X-ray detector 6) and the incident light (X-ray 11) form a certain included angle.

In this embodiment, the included angle between the infrared thermal imager 12 and the X-ray 11 and the included angle between the fluorescent detector (silicon drift X-ray detector 6) and the X-ray 11 are both 45°. Other parts are the same as or similar to those of the embodiments shown in FIGS. 6 to 11.

The above are only embodiments of the present application and is not intended to limit the protection scope of the present application, and various modifications and changes may be made to the present application by those skilled in the art. Any modification, equivalent replacement, or improvement made within the spirit and principle of the present application shall be included in the protection scope of the present application.

INDUSTRIAL APPLICABILITY

The multi-physical field measurement device for a metal solidification process, and the housing and the measurement method thereof according to the embodiments of the present application can simultaneously measure in situ the temperature field, the solute field, the strain field, and the flow field in the metal solidification process.

What is claimed is:
1. A multi-physical field measurement device for a metal solidification process, comprising:
    a sealed housing, provided with a light-through hole for allowing an external X-ray to be emitted into an inside of the housing;
    a heater, provided inside the housing, located behind the light-through hole along the X-ray, and configured for heating a to-be-detected sample;
    a diffraction detector, configured for receiving the X-ray which penetrates through the sample and is scattered;
    a CMOS camera, located behind the heater along the X-ray and configured for receiving a visible light signal which penetrates through the sample;
    a silicon drift X-ray detector, located at one side of the X-ray and configured for receiving a fluorescent signal sent by interaction between the X-ray and the sample; and
    an infrared thermal imager, located at the other side of the X-ray and configured for receiving an infrared signal sent by the sample;
    wherein the multi-physical field measurement device performs a measurement method which comprising following steps of:
    heating the to-be-detected sample by the heater, adjusting the X-ray to be emitted into the inside of the housing through the light-through hole and to irradiate the sample, converting the X-ray penetrating through the sample into the visible light signal, receiving the visible light signal by the CMOS camera, to obtain an image of dendritic crystal morphology of the sample solidification process;
    the diffraction detector receiving the X-ray which penetrates through the sample and is scattered, so as to realize qualitative analysis, lattice constant determination and stress measurement of a matter structure;
    the infrared thermal imager receiving the infrared signal sent by the sample to realize temperature measurement of a sample micro region; and
    the silicon drift X-ray detector receiving the fluorescent signal sent by interaction between the X-ray irradiated on the sample and the sample to realize quantitative measurement of element ingredient of the sample.

2. The multi-physical field measurement device for a metal solidification process according to claim 1, further comprising a scintillator which is located behind the heater along the X-ray and in front of the CMOS camera, wherein the X-ray penetrating through the sample passes through the scintillator to form the visible light signal which is then received by the CMOS camera.

3. The multi-physical field measurement device for a metal solidification process according to claim 2, further comprising an optical lens group configured for amplifying the visible light signal and reflecting the visible light signal to be received by the CMOS camera, wherein the optical lens group is located behind the scintillator along the X-ray, and the CMOS camera is configured for receiving the visible light signal reflected by the optical lens group.

4. The multi-physical field measurement device for a metal solidification process according to claim 1, further comprising a baffle with a small hole, provided between the heater and the silicon drift X-ray detector, wherein the fluorescent signal passes through the small hole to be received by the silicon drift X-ray detector.

5. The multi-physical field measurement device for a metal solidification process according to claim 1, wherein the diffraction detector, the CMOS camera, the silicon drift X-ray detector, and the infrared thermal imager are all located outside the housing, and windows configured for allowing the signals to penetrate therethrough are provided at corresponding positions on the housing.

6. The multi-physical field measurement device for a metal solidification process according to claim 1, wherein a top and a tail of the housing are respectively provided with a third window and a fifth window configured for placing the diffraction detector.

7. The multi-physical field measurement device for a metal solidification process according to claim 1, further comprising a PC terminal provided outside the housing, wherein the PC terminal is connected with the diffraction detector, the CMOS camera, the silicon drift X-ray detector and the infrared thermal imager, respectively.

8. The multi-physical field measurement device for a metal solidification process according to claim 7, further comprising a micro-motion displacement platform configured for moving the sample.

9. The multi-physical field measurement device for a metal solidification process according to claim 8, further comprising a controller provided outside the housing, wherein the controller is connected with the heater, the micro-motion displacement platform and the PC terminal, respectively.

10. The multi-physical field measurement device for a metal solidification process according to claim 1, further comprising a cooling assembly configured for reducing an internal temperature of the housing; and/or, the multi-physical field measurement device further comprises a vacuum pump provided outside the housing, the vacuum pump is communicated with the housing, and a gas flowmeter is provided on a communication pipeline.

11. The multi-physical field measurement device for a metal solidification process according to claim 1, wherein the housing is made of stainless steel, and an inner surface thereof is a frosted surface; and/or, a viewing window is provided on the housing; and/or an openable cabin door is provided on the housing.

12. The multi-physical field measurement device for a metal solidification process according to claim 1, comprising:
   a vacuum water-cooling cavity system, comprising a housing and a cooling assembly provided in the housing and configured for reducing an internal temperature of the housing, wherein a front end of the housing is provided with a light-through hole for allowing the external X-ray to be emitted into the inside of the housing, a left side of the housing is provided with a high-temperature resistant glass viewing window, and the housing is provided with an openable cabin door configured for facilitating adjustment of a sample;
   a sample temperature control system, comprising a heater which is provided inside the housing, located behind the light-through hole along the X-ray and configured for fixing and heating the to-be-detected sample;
   a sample transmission system, comprising a micro-motion displacement platform provided below the heater and configured for moving the heater and changing a position of the sample fixed thereto;
   a synchronous X-radiation detector system, comprising a diffraction detector configured for receiving the X-ray penetrating through the sample and scattered, a CMOS camera configured for measuring a flow field in the metal solidification process, a silicon drift X-ray detector configured for measuring a solute field in the metal solidification process, and an infrared thermal imager configured for measuring a temperature field in the metal solidification process, wherein the diffraction detector is provided at a top of a cavity and/or a tail of the cavity, the CMOS camera is located behind the heater along the X-ray, the silicon drift X-ray detector is located at one side of the X-ray and configured for receiving the fluorescent signal emitted by interaction between the X-ray and the sample, and the infrared thermal imager is located at the other side of the X-ray and configured for receiving an infrared signal sent by the sample; and
   a data collection and analysis system, comprising a PC terminal and a controller which are provided outside the housing, wherein the PC terminal is connected with the diffraction detector, the CMOS camera, the silicon drift X-ray detector and the infrared thermal imager respectively, and the controller is connected with the heater, the micro-motion displacement platform and the PC terminal.

13. A multi-physical field measurement system for a metal solidification process, comprising the multi-physical field measurement device for a metal solidification process according to claim 1, and an analysis device configured for analyzing multi-physical field data obtained by the multi-physical field measurement device for a metal solidification process, wherein a PC terminal of the multi-physical field measurement device for a metal solidification process is connected with the analysis device.

14. The multi-physical field measurement device for a metal solidification process according to claim 3, wherein the CMOS camera is located above the optical lens group, and the optical lens group directly faces the incident X-ray, forms an angle of 45° relative to an optical path of the incident X-ray and reflects light upwards to be received by the CMOS camera.

15. The multi-physical field measurement device for a metal solidification process according to claim 6, wherein the third window is of a long strip shape, and the fifth window is circular and is sealed by a Kapton film.

16. The multi-physical field measurement device for a metal solidification process according to claim 6, wherein a window which extends into a cavity is provided on a right side of the housing and is configured for placing the infrared thermal imager, and calcium fluoride optical glass is adopted for the window.

17. The multi-physical field measurement device for a metal solidification process according to claim 6, wherein a window which extends into the cavity is provided on a left side of the housing and is configured for placing the silicon drift X-ray detector, and the window is sealed by a Kapton film.

18. The multi-physical field measurement device for a metal solidification process according to claim 6, wherein a fourth window is further provided on the top of the housing and configured for placing the CMOS camera.

19. The multi-physical field measurement device for a metal solidification process according to claim 10, wherein the cooling assembly is a circulating water path arranged inside the housing.

* * * * *